United States Patent
Fukuda et al.

(10) Patent No.: US 8,213,532 B2
(45) Date of Patent: Jul. 3, 2012

(54) INFORMATION PROCESSING DEVICE AND BIDIRECTIONAL TRANSMISSION METHOD

(75) Inventors: Kunio Fukuda, Tokyo (JP); Toru Terashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 494 days.

(21) Appl. No.: 12/483,522

(22) Filed: Jun. 12, 2009

(65) Prior Publication Data

US 2010/0027710 A1 Feb. 4, 2010

(30) Foreign Application Priority Data

Jul. 31, 2008 (JP) ................................. 2008-198394

(51) Int. Cl.
*H04L 25/49* (2006.01)
(52) U.S. Cl. ........ 375/293; 375/264; 375/286; 375/288; 375/289; 341/56
(58) Field of Classification Search .................. 375/264, 375/286, 288, 289, 293; 341/56
See application file for complete search history.

(56) References Cited

U.S. PATENT DOCUMENTS 5,853,123 A * 12/1998 Okano et al. .................... 236/51
2003/0194017 A1 * 10/2003 Woodworth ................... 375/286
2008/0170643 A1 * 7/2008 Lee ................................. 375/340

FOREIGN PATENT DOCUMENTS

JP 3-109843 5/1991

* cited by examiner

*Primary Examiner* — Leon Flores
(74) *Attorney, Agent, or Firm* — Oblon, Spivak, McClelland, Maier & Neustadt, L.L.P.

(57) ABSTRACT

In a provided information processing device, a first information processing module, within its transmission time segment, transmits an encoded signal in which mutually distinct first and second bit values are respectively expressed by pluralities of mutually distinct first amplitude values and second amplitude values, the same amplitude value not occurring consecutively and the amplitude value polarity being inverted with each cycle. Within a transmission time segment for a second information processing module, the first information processing module transmits a clock signal that corresponds to the cycle at which the polarity is inverted. The second information processing module extracts the clock signal by detecting the polarity inversions in the encoded signal, decodes the first and second bit values from the encoded signal using the clock signal, generates a transmission signal by controlling the amplitude values of the clock signal, and transmits the transmission signal in synchronization with the clock signal.

5 Claims, 20 Drawing Sheets

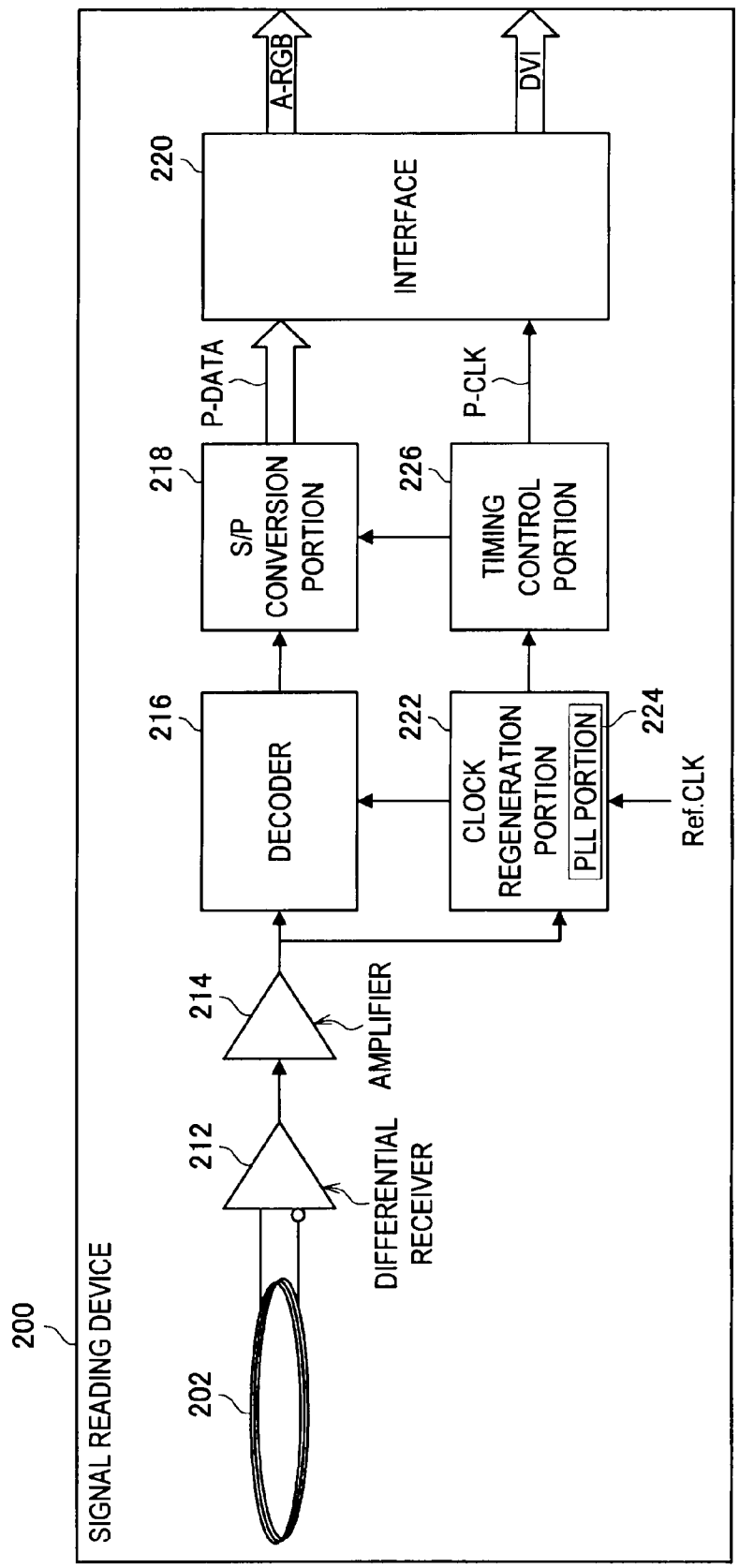

EXAMPLE OF CIRCUIT CONFIGURATION OF CLOCK DETECTION PORTION 332

FIG. 14

DETERMINATION TABLE FOR DATA DETERMINATION (STORAGE PORTION 364)

| COMPARATOR 354 | COMPARATOR 356 | COMPARATOR 358 | COMPARATOR 360 | OUTPUT DATA |
|---|---|---|---|---|
| 1 | 1 | 1 | 1 | 1 |
| 0 | 1 | 1 | 1 | 0 |
| 0 | 0 | 1 | 1 | 1 |
| 0 | 0 | 0 | 1 | 0 |
| 0 | 0 | 0 | 0 | 1 |

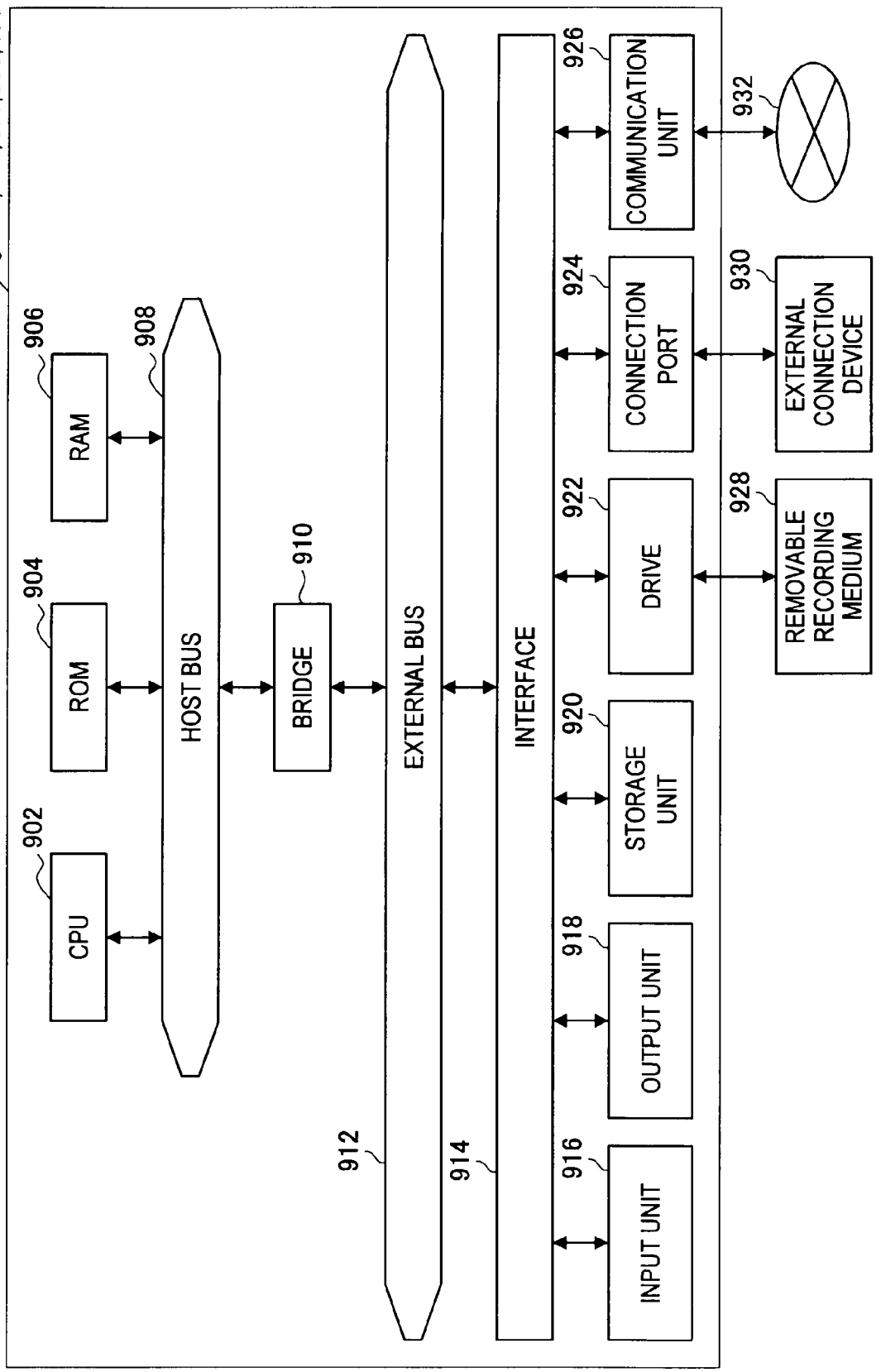

INFORMATION PROCESSING DEVICE AND BIDIRECTIONAL TRANSMISSION METHOD

BACKGROUND OF THE INVENTION

1. Field of the Invention

The present invention relates to an information processing device and a bidirectional transmission method.

2. Description of the Related Art

Most mobile terminals that are typified by mobile telephones and the like use a movable member for a connecting portion between an operation portion that a user operates and a display portion on which information is displayed. Typical examples include the opening and closing structures and the like of folding-type mobile telephones. Furthermore, in addition to telephone functions and e-mail functions, recent mobile telephones are provided with functions for watching and listening to videos, functions for taking photographs, and the like that require the connecting portion described above to be moved in complicated ways according to the user's purpose. For example, in a case where the mobile telephone is used to watch and listen to a video, it is conceivable that the user would want to turn the display portion toward himself and to stow the operation portion, which is not necessary for watching and listening. Thus a structure is required by which the position and orientation of the display portion can be easily changed according to the purpose, such as when the mobile telephone is used as a telephone, when it is used as a digital camera, when it is used as a television receiver, and the like.

However, a large number of signal lines and electric power lines pass through the connecting portion between the operation portion and the display portion. For example, dozens of wires are connected in parallel in the display portion (refer to FIG. 1). Therefore, when a movable member that can be moved in a complicated manner like that described above is used for the connecting portion, the reliability and the like of the wiring diminishes considerably. For this reason, the technology has been shifting from a parallel transmission method to a serial transmission method (refer to FIG. 2) in order to decrease the number of signal lines in the connecting portion. Of course, technological shifts for the same kinds of reasons are not limited to the realm of mobile telephones, but are also occurring in a wide variety of electronic devices for which complicated wiring is required. Note that an additional reason for the shift to serial transmission is to reduce electromagnetic interference (EMI).

In a serial transmission method like that described above, the transmission data is transmitted after being encoded by a specified method. The encoding method that is used may be, for example, the non-return to zero (NRZ) encoding method, the Manchester encoding method, the Alternate Mark Inversion (AMI) encoding method, or the like. For example, in Japanese Patent Application Publication No. JP-A-3-109843, a data transmission technology is disclosed that uses the AMI code, which is a representative example of a bipolar code. In the same document, another technology is disclosed by which a data clock is expressed by an intermediate value of the signal level and transmitted, and the data clock is then regenerated on the receiving side based on the signal level.

SUMMARY OF THE INVENTION

Among the encoding methods that are described above, the NRZ encoding method produces a signal that contains a direct current component. It is therefore difficult to transmit the NRZ-encoded signal together with a direct current component such as the power supply or the like. On the other hand, the signals that are produced by the Manchester encoding method and the AMI encoding method do not contain a direct current component. It is therefore possible to transmit the signals together with a direct current component such as the power supply or the like. However, the Manchester encoding method and the AMI encoding method make it necessary to have a phase-locked loop (PLL) circuit on the receiving side in order to regenerate the data clock of the signal. However, providing the PLL circuit on the receiving side increases the amount of electric current that is consumed. Moreover, with the Manchester encoding method, the data is transmitted by raising and lowering the amplitude, so it is necessary to transmit a clock that is two times the data rate. The resulting high clock operation increases the amount of electric current that is consumed.

A technology has been developed that addresses these problems by generating and transmitting a signal that does not contain a direct current component and does not require a PLL circuit when the clock is regenerated.

The technology takes input data that contains mutually different first and second bit values, then encodes and transmits the data by expressing the first bit value in the form of a plurality of first amplitude values and expressing the second bit value in the form of second amplitude values that differ from the first amplitude values, such that the same amplitude value does not occur twice in succession and the polarity of the amplitude values is inverted with each cycle. However, in a case where an attempt is made to implement bidirectional communication, even if the encoding described above is used, a PLL circuit is required in order to generate the clock that is used to transmit the signal.

Accordingly, the present invention addresses the problems that are described above and provides an information processing device and a bidirectional transmission method that are new and improved and that, by using a code that does not contain a direct current component and does not require a PLL circuit when the clock is regenerated, make it possible to implement bidirectional communication, even in a case where a PLL circuit is not provided on the receiving side.

In order to address the problems that are described above, according to an aspect of the present invention, an information processing device is provided that includes a first information processing module and a second information processing module. The first information processing module transmits, within a transmission time segment for the first information processing module, an encoded signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle. Within a transmission time segment for the second information processing module, the first information processing module transmits a clock signal that corresponds to the cycle at which the polarity of the encoded signal is inverted. The second information processing module includes a clock signal extraction portion, an input data decoding portion, a transmission signal generation portion, and a signal transmission portion. The clock signal extraction portion extracts the clock signal by detecting the polarity inversions in the signal that is transmitted by the first information processing module. The input data decoding portion decodes the input data by using the clock signal that has been extracted by the clock signal extraction portion to determine the first and second bit values based on the encoded signal. The transmission signal generation portion generates a transmission signal by controlling the amplitude values of the clock signal. The signal transmission portion transmits, in synchronization with the clock signal, the transmission signal that has been generated by the transmission signal generation portion.

The clock signal extraction portion may also include a filter for suppressing jitter that is included in the extracted clock signal. In that case, the transmission signal generation portion will generate the transmission signal by controlling the amplitude values of the clock signal in which the jitter has been suppressed by the filter.

The transmission signal generation portion may also generate the transmission signal by controlling the amplitude values of the clock signal such that a direct current component is not included. In that case, the signal transmission portion will transmit the transmission signal that has been generated by the transmission signal generation portion by superposing it on a direct current power supply.

The second information processing module may also be provided in a display portion of a mobile terminal that includes the display portion for displaying an image and includes a processing portion for processing data. The second information processing module may also receive a signal in which data is encoded for the image that will be displayed by the display portion and may also transmit to the processing portion a transmission signal that corresponds to data that has a smaller data volume than does the image data, the signal being transmitted by being superposed on the direct current power supply.

Furthermore, in order to address the problems that are described above, according to another aspect of the present invention, a bidirectional transmission method includes a step of transmitting, within a transmission time segment for a first information processing module, a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle, the signal being transmitted by the first information processing module. The bidirectional transmission method also includes steps of receiving the signal that has been transmitted by the first information processing module, extracting a clock signal by detecting polarity inversions in the received signal, and decoding the input data in the received signal by using the extracted clock signal, each of these steps being performed by a second information processing module. The bidirectional transmission method also includes a step of transmitting the clock signal within a transmission time segment for the second information processing module, the clock signal being transmitted by the first information processing module. The bidirectional transmission method also includes steps of receiving the signal that has been transmitted by the first information processing module and extracting the clock signal by detecting polarity inversions in the received signal, each of these steps being performed by the second information processing module. The bidirectional transmission method also includes steps of generating a transmission signal by controlling the amplitude values of the extracted clock signal and transmitting the generated transmission signal in synchronization with the extracted clock signal, each of these steps being performed by the second information processing module.

In addition, in order to address the problems that are described above, according to another aspect of the present invention, a program can be provided that causes the functions of the information processing device that is described above to be implemented by a computer. A computer-readable storage medium in which the program is stored can also be provided.

According to the embodiments of the present invention that are described above, using a code that does not contain a direct current component and that does not require a PLL circuit when the clock signal is regenerated makes it possible to implement bidirectional transmission even in a case where a PLL circuit is not provided on the receiving side.

BRIEF DESCRIPTION OF THE DRAWINGS

FIG. 6 is an explanatory figure that shows an example of a functional configuration of a signal reading device that uses serial transmission;

FIG. 14 is an explanatory figure that shows an example of a configuration of a determination table for data determination;

FIG. 20 is an explanatory figure that shows an example of a hardware configuration of a mobile terminal.

DETAILED DESCRIPTION OF THE PREFERRED EMBODIMENTS

Figure 1:
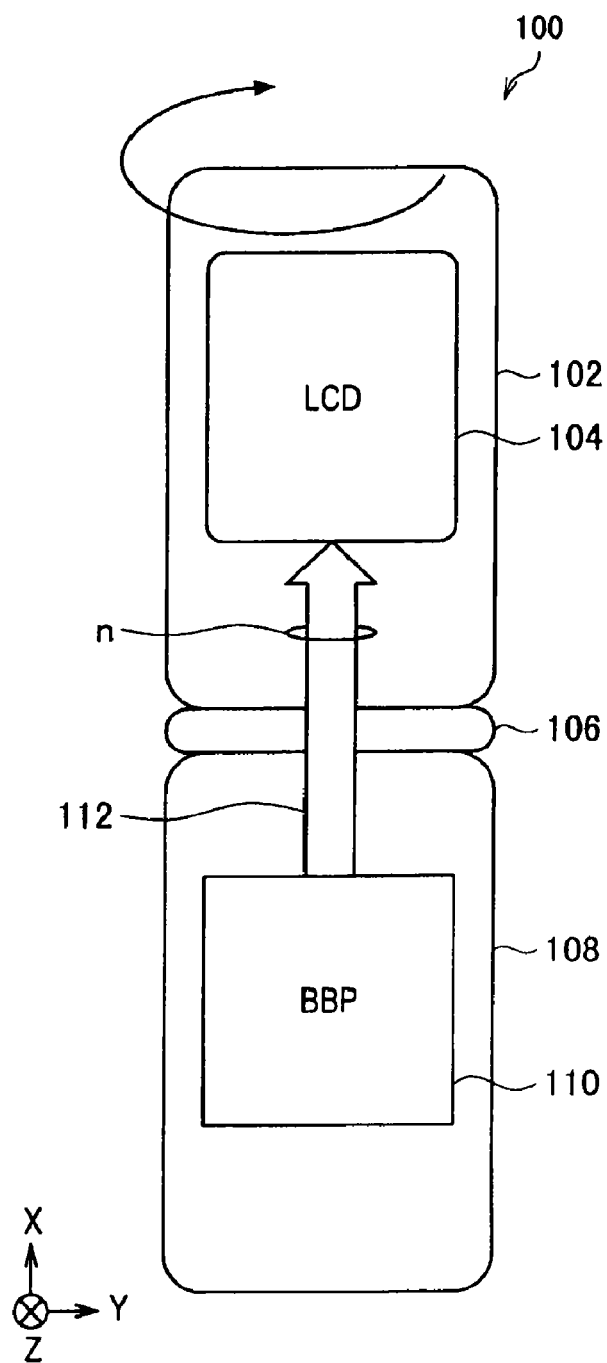
FIG. 1 is an explanatory figure that shows an example of a configuration of a mobile terminal.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Flow of Explanation

The flow of the explanation of the embodiments of the present invention that are hereinafter described will be briefly explained. First, the technical issues facing mobile telephones and the like that use a parallel transmission method will be briefly explained with reference to FIG. 1. Next, the issues facing signal transmission technologies that use a serial transmission method will be explained with reference to FIGS. 2 to 8. Next, a new signal transmission technology that has been conceived for the purpose of resolving the issues facing signal transmission technologies that use a serial transmission method will be explained with reference to FIGS. 9 to 15. The technical issues facing this sort of new signal transmission technology will also be explained.

A configuration and a signal processing method of a mobile terminal according to an embodiment of the present invention will be explained with reference to FIGS. 16 to 19 in light of the technological features of the new signal transmission technology described above and the issues facing it. Next, the technical concepts of the embodiment and the effects of applying those technical concepts will be briefly explained. Finally, an example of a hardware configuration of a terminal device that utilizes the technology according to the embodiment will be explained with reference to FIG. 20.

Summary of Issues

First, before the technology according to the embodiment of the present invention is explained in detail, the issues to be resolved by the embodiment will be briefly explained.

Parallel Transmission Method

First, an example of a configuration of a mobile terminal 100 that uses the parallel transmission method will be briefly explained with reference to FIG. 1. FIG. 1 is an explanatory figure that shows the example of the configuration of the mobile terminal 100 that uses the parallel transmission method. Note that in FIG. 1, a mobile telephone is schematically illustrated as an example of the mobile terminal 100. However, the scope of use of the technology according to the explanation that follows is not limited to a mobile telephone.

As shown in FIG. 1, the mobile terminal 100 is mainly configured from a display portion 102, a liquid crystal display (LCD) 104, a connecting portion 106, an operation portion 108, a base band processor (BBP) 110, and a parallel signal path 112. Note that in some cases, the display portion 102 is called a display side (D), and the operation portion 108 is called a main body side (M). Furthermore, in the explanation that follows, an example will be explained of a case in which a video signal is transmitted from the main body side to the display side. Of course, the technology that is described below is not limited to this example.

As shown in FIG. 1, the LCD 104 is provided in the display portion 102. A video signal that is transmitted through the parallel signal path 112 is displayed on the LCD 104. The connecting portion 106 is a member that connects the display portion 102 and the operation portion 108. The connecting member that forms the connecting portion 106 has a structure that can rotate the display portion 102 180 degrees within the Z-Y plane. The connecting member also has a structure that is formed such that the display portion 102 can be rotated within the X-Z plane such that the mobile terminal 100 can be folded up. Note that the connecting member may also have a structure that allows the display portion 102 to move freely in any direction.

The BBP 110 is a computational processing portion that provides the mobile terminal 100 with a communication control function and an application execution function. A parallel signal that is output from the BBP 110 is transmitted through the parallel signal path 112 to the LCD 104 of the display portion 102. The parallel signal path 112 is provided with a plurality of signal lines. In the case of a mobile telephone, for example, the number n of the signal lines is approximately fifty lines. The video signal transmission speed is approximately 130 Mbps in a case where the resolution of the LCD 104 is QVGA. The parallel signal path 112 is wired such that the lines pass through the connecting portion 106.

In other words, the plurality of signal lines that form the parallel signal path 112 are provided in the connecting portion 106. As mentioned in the Description of the Related Art section, if the range of movement of the connecting portion 106 is increased, the risk increases that the movement will inflict damage on the parallel signal path 112. This would result in impairment of the reliability of the parallel signal path 112. On the other hand, if the reliability of the parallel signal path 112 is maintained, the range of movement of the connecting portion 106 will be restricted. It is for this reason that the serial transmission method has come to be widely used in mobile telephones and the like in order to maintain the reliability of the parallel signal path 112 while also increasing the degree of freedom of the movable member that forms the connecting portion 106. The shift to the serial transmission method for the transmission path is also being promoted from the standpoint of EMI.

Serial Transmission Method

Figure 2:
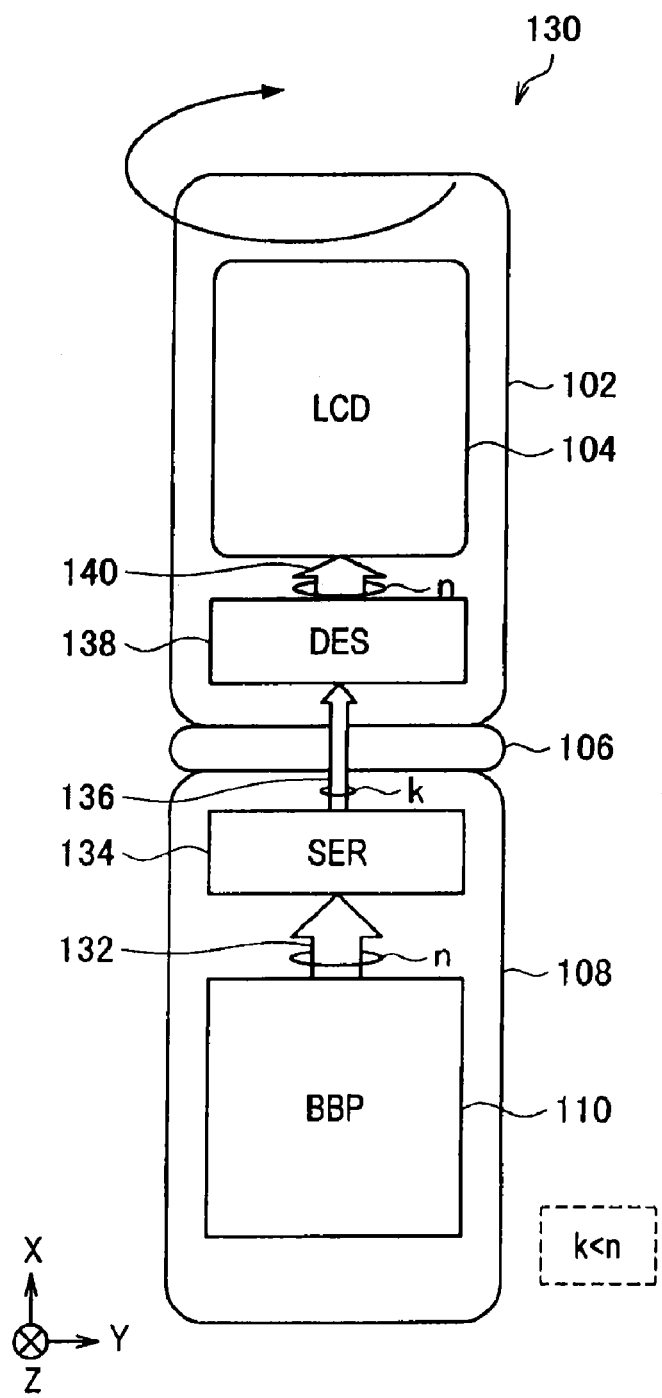
FIG. 2 is an explanatory figure that shows an example of a configuration of a mobile terminal.

Now an example of a configuration of a mobile terminal 130 that uses the serial transmission method will be briefly explained with reference to FIG. 2. FIG. 2 is an explanatory figure that shows the example of the configuration of the mobile terminal 130 that uses the serial transmission method. Note that in FIG. 2, a mobile telephone is schematically illustrated as an example of the mobile terminal 130. However, the scope of use of the technology according to the explanation that follows is not limited to a mobile telephone. Note also that configuring elements of the mobile terminal 130 that have substantially the same function as in the mobile terminal 100 that uses the parallel transmission method and is shown in FIG. 1 are denoted by the same reference numerals and detailed explanations will be omitted.

As shown in FIG. 2, the mobile terminal 130 is mainly configured from the display portion 102, the LCD 104, the connecting portion 106, the operation portion 108, the BBP 110, parallel signal paths 132, 140, a serializer 134, a serial signal path 136, and a deserializer 138.

Unlike the mobile terminal 100 that is described above, the mobile terminal 130 transmits the video signal by the serial transmission method through the serial signal path 136 that is wired through the connecting portion 106. Therefore, the serializer 134 is provided in the operation portion 108 to serialize the parallel signal that is output from the BBP 110. On the other end, the deserializer 138 is provided in the display portion 102 to parallelize the serial signal that is transmitted through the serial signal path 136.

The serializer 134 converts the parallel signal that is output from the BBP 110 and input through the parallel signal path 132 into a serial signal. The serial signal that has been converted by the serializer 134 is input to the deserializer 138 through the serial signal path 136. Next, the deserializer 138 restores the input serial signal to the original parallel signal and inputs it to the LCD 104 through the parallel signal path 140.

In the serial signal path 136, a data signal that is encoded by the NRZ encoding method, for example, may be transmitted on its own, and alternatively, the data signal and a clock signal may be transmitted together. The number k of the lines in the serial signal path 136 is significantly less than the number n of the lines in the parallel signal path 112 in the mobile terminal 100 in FIG. 1 ($1 \leq k \ll n$). For example, the number k of the lines can be reduced to only a few lines. Therefore, the degree of freedom of the connecting portion 106 through which the serial signal path 136 passes can be said to be very much greater than that of the connecting portion 106 through which the parallel signal path 112 passes. At the same time, it can also be said that the reliability of the serial signal path 136 is high. Note that ordinarily, a differential signal such as a low voltage differential signal (LVDS) or the like is used for the serial signal that flows through the serial signal path 136.

Functional Configuration

Figure 3:
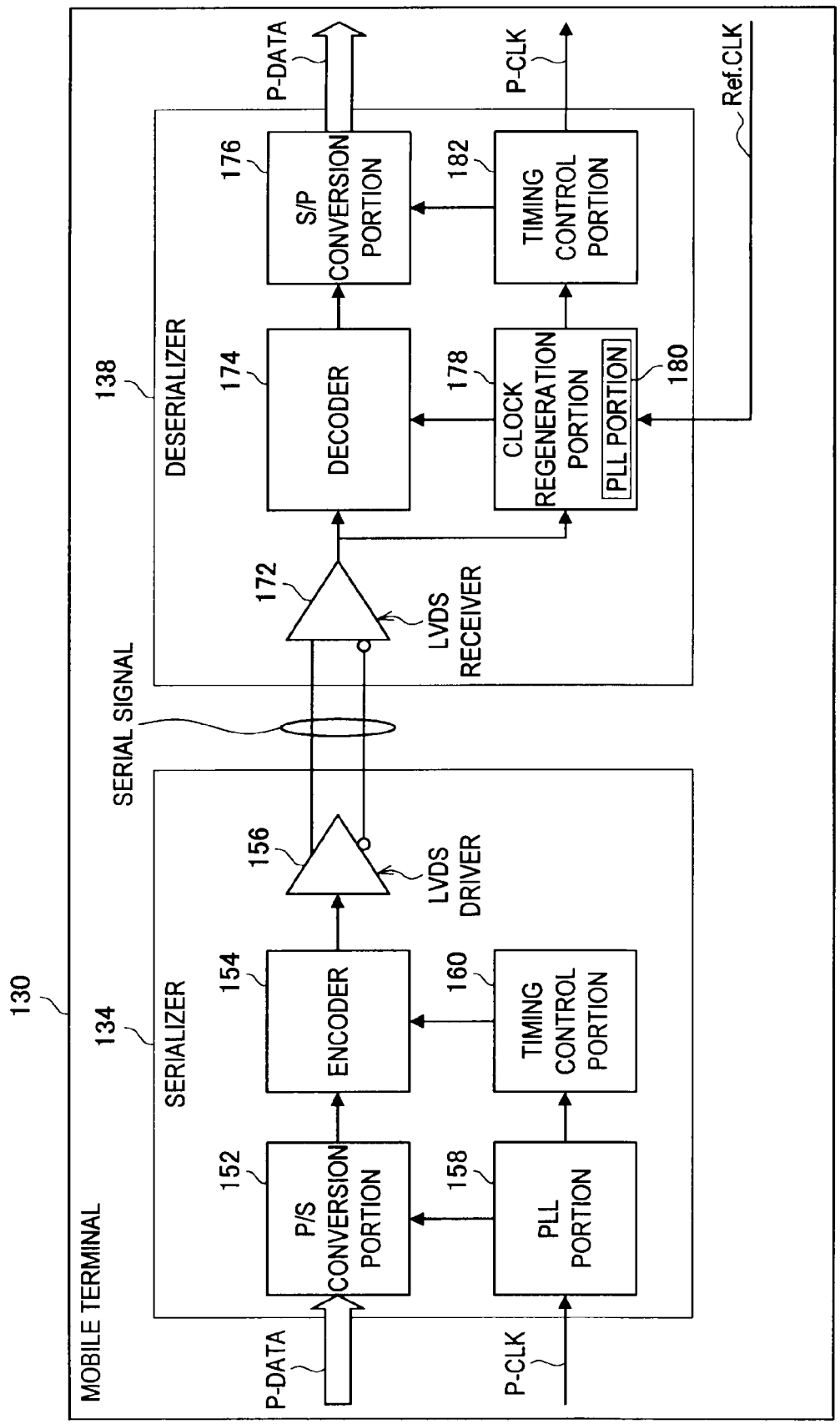
FIG. 3 is an explanatory figure that shows an example of a functional configuration of a mobile terminal that uses serial transmission.

Next, a functional configuration of the mobile terminal 130 that uses the serial transmission method will be explained with reference to FIG. 3. FIG. 3 is an explanatory figure that shows an example of the functional configuration of the mobile terminal 130 that uses the serial transmission method. However, FIG. 3 is an explanatory figure that mainly illustrates the functional configurations of the serializer 134 and the deserializer 138, so descriptions of the other configuring elements will be omitted.

Serializer 134

As shown in FIG. 3, the serializer 134 is configured from a P/S conversion portion 152, an encoder 154, an LVDS driver 156, a PLL 158, and a timing control portion 160.

As shown in FIG. 3, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 154. The encoder 154 appends a header and the like to the serial signal and inputs it to the LVDS driver 156. The LVDS driver 156 transmits the input serial signal to the deserializer 138 by a differential transmission method according to LVDS.

In contrast, the parallel signal clock that is input to the serializer 134 is input to the PLL 158. The PLL 158 generates a serial signal clock from the parallel signal clock and inputs it to the P/S conversion portion 152 and to the timing control portion 160. The timing control portion 160 controls the timing of the transmission of the serial signal by the encoder 154, based on the serial signal clock that is input.

Deserializer 138

As shown in FIG. 3, the deserializer 138 is mainly configured from an LVDS receiver 172, a decoder 174, an S/P conversion portion 176, a clock regeneration portion 178, a PLL 180, and a timing control portion 182.

As shown in FIG. 3, the serial signal is transmitted to the deserializer 138 by the differential transmission method according to LVDS. The serial signal is received by the LVDS receiver 172. The serial signal that is received by the LVDS receiver 172 is input to the decoder 174 and to the clock regeneration portion 178. The decoder 174 detects the beginning portion of the data by referring to the header in the input serial signal and inputs the signal to the S/P conversion portion 176. The S/P conversion portion 176 converts the input serial signal into the parallel signal (P-DATA). The parallel signal that has been converted by the S/P conversion portion 176 is output to the LCD 104.

For its part, the clock regeneration portion 178 uses the built-in PLL 180 to regenerate the parallel signal clock from the serial signal clock by referring to a reference clock that is input from the outside. The parallel signal clock that has been regenerated by the clock regeneration portion 178 is input to the decoder 174 and to the timing control portion 182. The timing control portion 182 controls the receiving timing based on the parallel signal clock that is input from the clock regeneration portion 178. The parallel signal clock (P-CLK) that is input to the timing control portion 182 is output to the LCD 104.

In this manner, the parallel signal (P-DATA) and the parallel signal clock (P-CLK) that are input to the serializer 134 from the BBP 110 are converted into the serial signals and transmitted to the deserializer 138. The input serial signals are then restored by the deserializer 138 to the original parallel signal and parallel signal clock and are output to the LCD 104.

As in the mobile terminal 130 that is explained above, the transmission path is serialized by converting the parallel signal into the serial signal and transmitting the serial signal. The range of movement of the portion through which the serial signal path passes is enlarged as a result, and the degree of freedom in the disposition of the display portion 102 is increased. Therefore, in a case where the mobile terminal 130 is used to watch and listen to a television broadcast or the like, for example, it is possible to transform the mobile terminal 130 such that the display portion 102 is disposed in a landscape orientation from the user's point of view. The increase in the degree of freedom brings with it a wider range of uses for the mobile terminal 130, such that with the addition of various types of communication terminal functions, a wide variety of uses becomes possible, such as watching videos, listening to music, and the like.

Against this backdrop, the LCD 104 of the mobile terminal 130 has come to be provided with higher density that makes a more detailed display possible, such that large amounts of information can be displayed in the form of small text characters and video images. However, the small text characters and video images are difficult for the user to see. Accordingly, there is user demand for the text characters and video images that are displayed on the LCD 104 of the mobile terminal 130 to be output to a large screen, such as an externally provided television receiver, display device, or the like. In response to the demand, output configurations have been proposed such as that of a mobile terminal 190 that is shown in FIG. 4. This output configuration will be briefly explained below.

USE EXAMPLE 1

External Output Method that uses Electromagnetic Coupling

Figure 4A:
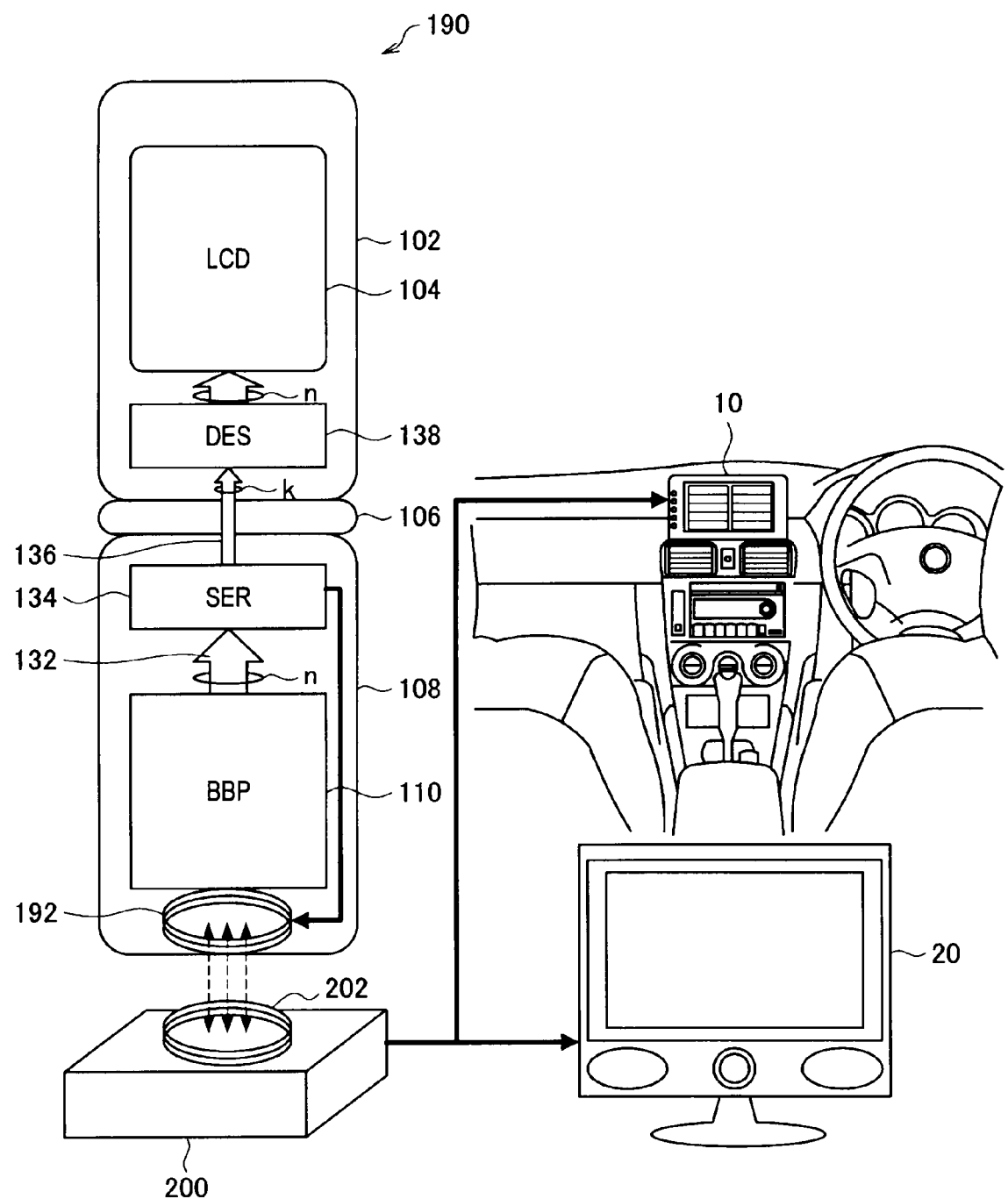
FIG. 4A is an explanatory figure that shows an example of a configuration of a mobile terminal.

First, refer to FIG. 4A. FIG. 4A is an explanatory figure that shows an example of a configuration of the mobile terminal 190 that is capable of using electromagnetic coupling to transmit data such as video or the like to an external output device. The external output device may be a car navigation system 10, a television receiver 20, or the like. Additional examples of the external output device include a display device for a personal computer, a projector that projects video onto a screen, and the like.

As shown in FIG. 4A, a signal reading device 200 is used to transmit data such as video or the like to the external output device. The signal reading device 200 may be connected to the car navigation system 10, the television receiver 20, or the like, and it may also be built into the devices. Signals are transmitted between the mobile terminal 190 and the signal reading device 200 using electromagnetic coupling. A coil 192 is provided in the mobile terminal 190 for that purpose. Further, a coil 202 is provided in the signal reading device 200.

Consider, for example, an operation in a case where a video signal is transmitted from the mobile terminal 190 to the television receiver 20. First, in the mobile terminal 190, the BBP 110 generates a parallel signal in order to transmit the video signal by parallel transmission. The parallel signal is then transmitted through the parallel signal path 132 to the serializer 134. The serializer 134 converts the transmitted parallel signal into a serial signal and transmits it through the serial signal path 136. At this point, an electric current signal that corresponds to the serial signal is applied to the coil 192, and an electromagnetic field is generated by the coil 192. The electromagnetic field induces an electric current to flow in the coil 202 of the signal reading device 200, and the serial signal is demodulated based on the electric current.

In this manner, the electromagnetic coupling between the mobile terminal 190 and the signal reading device 200 is used to transmit the serial signal that corresponds to the video signal. Of course, the serial signal is transmitted after being encoded by a specified encoding method and modulated by a specified modulation method, such as amplitude shift keying (ASK) or the like. However, a signal that is encoded by the NRZ encoding method contains a direct current component, so it is not suitable for signal transmission using electromagnetic coupling. Therefore, one of the Manchester encoding method and another method that does not include a direct current component in the encoded signal is used for signal transmission by electromagnetic coupling.

In the example is FIG. 4A, the serial signal is encoded by the serializer 134 according to the Manchester encoding method and transmitted using electromagnetic coupling. In this case, it is appropriate for the decoding in the signal reading device 200 to be done in accordance with the Manchester encoding method. Therefore, the signal reading device 200 receives the encoded signal and decodes into the serial signal, then converts the serial signal into a parallel signal and outputs it to the television receiver 20. In the Manchester code, "1" is transmitted as "10", and "0" is transmitted as "01", so a transmission speed is required that is twice that of a method that simply transmits "1" and "0". However, because the Manchester code does not contain a direct current component and the clock is easily extracted, it is well suited to signal transmission using electromagnetic coupling.

Figure 4B:
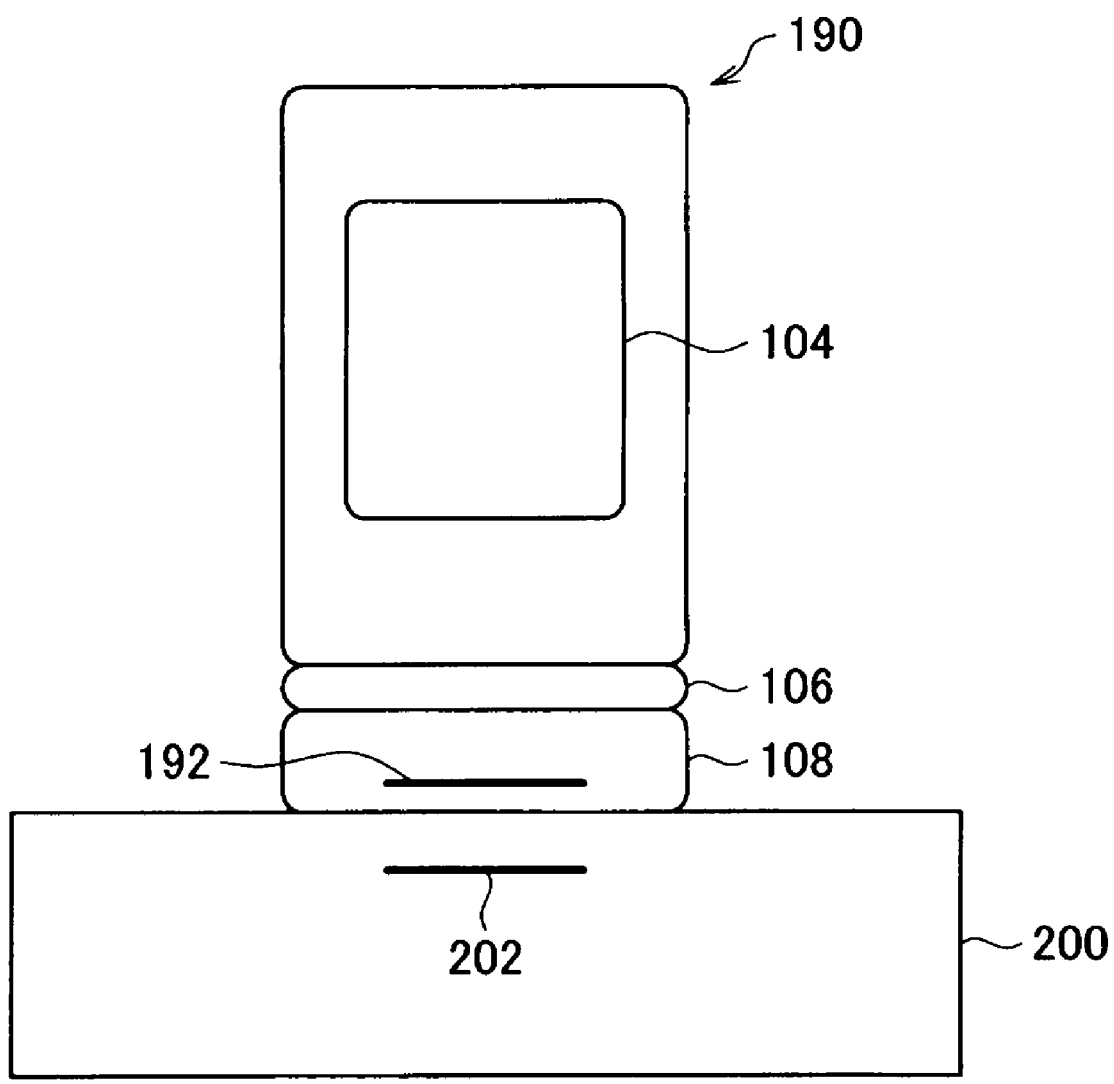
FIG. 4B is an explanatory figure that shows a state of connection between the mobile terminal and a signal reading device.

Incidentally, the signal transmission between the mobile terminal 190 and the signal reading device 200 is performed by placing them in close proximity to one another, as shown in FIG. 4B. Communication that is performed in this sort of configuration is called non-contact communication in some cases. In the example in FIG. 4B, the display portion 102 of the mobile terminal 190 is disposed in an open state, but the display portion 102 may also be disposed in a closed state. In most cases, the power supply to the LCD 104 is turned off when the display portion 102 of the mobile terminal 190 is closed, so this saves on power consumption. At this time, a mode is set that enables data transmission to the external output device even though the display portion 102 is in a closed state.

Functional Configuration: Mobile Terminal 190

Figure 5:
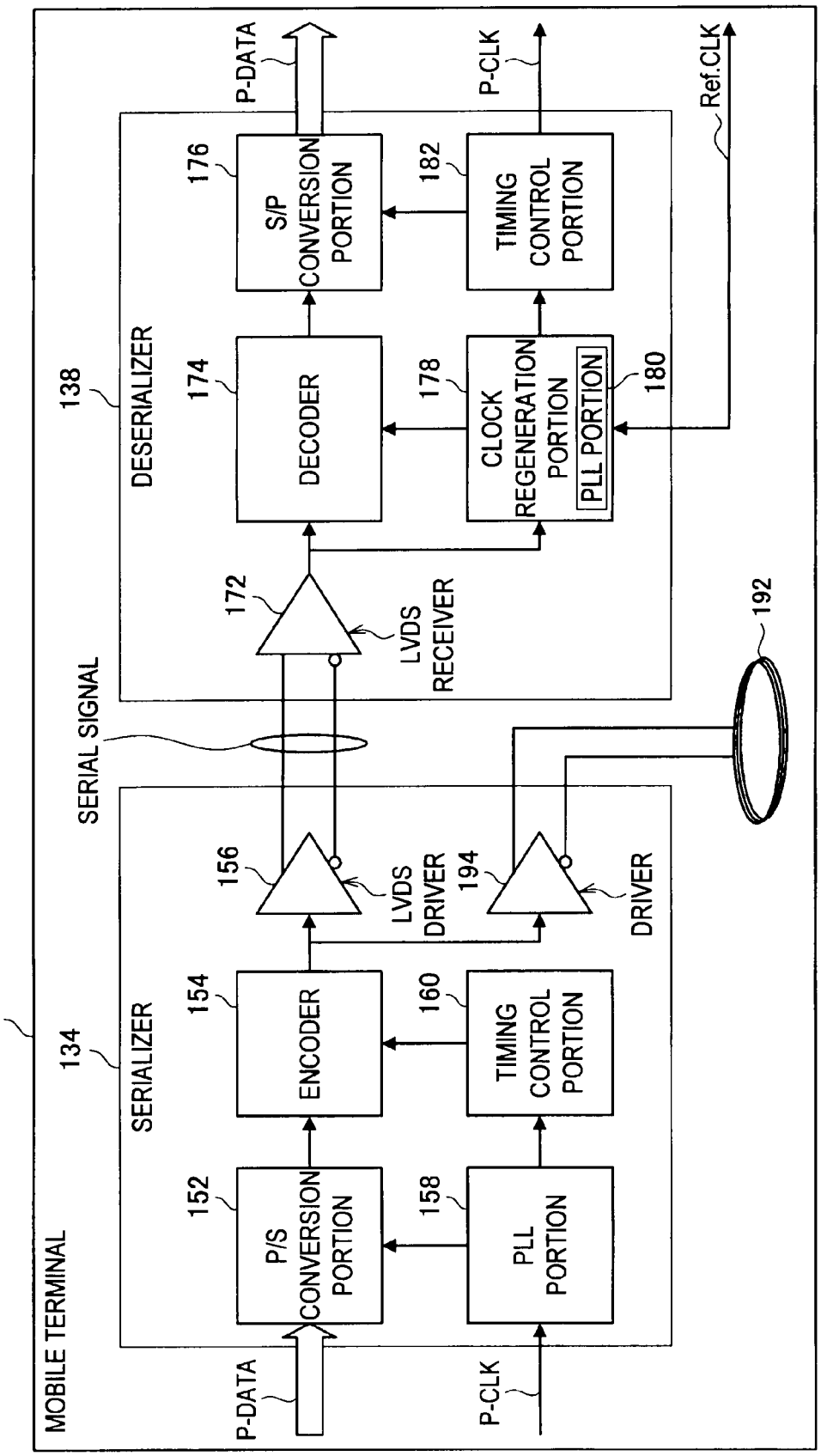
FIG. 5 is an explanatory figure that shows an example of a functional configuration of a mobile terminal that uses serial transmission.

Next, a functional configuration of the mobile terminal 190 will be briefly explained with reference to FIG. 5. FIG. 5 is an explanatory figure that shows an example of the functional configuration of the mobile terminal 190. However, FIG. 5 is an explanatory figure that mainly illustrates the functional configurations of the serializer 134 and the deserializer 138, so descriptions of the other configuring elements will be omitted. Note also that configuring elements of the mobile terminal 190 that have substantially the same function as in the mobile terminal 130 that has already been described are denoted by the same reference numerals and detailed explanations will be omitted.

Serializer 134

As shown in FIG. 5, the serializer 134 is configured from the P/S conversion portion 152, the encoder 154, the LVDS driver 156, the PLL 158, the timing control portion 160, and a driver 194.

As shown in FIG. 5, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 154.

The encoder 154 appends a header and the like to the serial signal, encodes the serial signal by the Manchester encoding method, and inputs the serial signal to the LVDS driver 156 and the driver 194. The LVDS driver 156 transmits the input serial signal to the deserializer 138 by a differential transmission method according to LVDS. For its part, the driver 194, using electromagnetic coupling by the coil 192, transmits the input serial signal to the signal reading device 200.

In contrast, the parallel signal clock that is input to the serializer 134 is input to the PLL 158. The PLL 158 generates a serial signal clock from the parallel signal clock and inputs it to the P/S conversion portion 152 and to the timing control portion 160. The timing control portion 160 controls the timing of the transmission of the serial signal by the encoder 154, based on the serial signal clock that is input.

Deserializer 138

As shown in FIG. 5, the deserializer 138 is mainly configured from the LVDS receiver 172, the decoder 174, the S/P conversion portion 176, the clock regeneration portion 178, the PLL 180, and the timing control portion 182.

As shown in FIG. 5, the serial signal is transmitted from the serializer 134 to the deserializer 138 by the differential transmission method according to LVDS. The serial signal is received by the LVDS receiver 172. The serial signal that is received by the LVDS receiver 172 is input to the decoder 174 and to the clock regeneration portion 178. The decoder 174 detects the beginning portion of the data by referring to the header in the input serial signal, decodes the serial signal that was encoded by the Manchester encoding method, and inputs the signal to the S/P conversion portion 176. The S/P conversion portion 176 converts the input serial signal into the parallel signal (P-DATA). The parallel signal that has been converted by the S/P conversion portion 176 is output to the LCD 104.

For its part, the clock regeneration portion 178 uses the built-in PLL 180 to regenerate the parallel signal clock from the serial signal clock by referring to a reference clock that is input from the outside. The parallel signal clock that has been regenerated by the clock regeneration portion 178 is input to the decoder 174 and to the timing control portion 182. The timing control portion 182 controls the receiving timing based on the parallel signal clock that is input from the clock regeneration portion 178. The parallel signal clock (P-CLK) that is input to the timing control portion 182 is output to the LCD 104.

In this manner, the parallel signal (P-DATA) and the parallel signal clock (P-CLK) that are input to the serializer 134 from the BBP 110 are converted into the serial signals and transmitted to the deserializer 138. The input serial signals are then restored by the deserializer 138 to the original parallel signal and parallel signal clock and are output to the LCD 104.

Functional Configuration: Signal Reading Device 200

Next, a functional configuration of the signal reading device 200 will be briefly explained with reference to FIG. 6. FIG. 6 is an explanatory figure that shows an example of the functional configuration of the signal reading device 200.

As shown in FIG. 6, the signal reading device 200 is mainly configured from the coil 202, a differential receiver 212, an amplifier 214, a decoder 216, an S/P conversion portion 218, an interface 220, a clock regeneration portion 222, a PLL 224, and a timing control portion 226.

As described above, the serial signal is transmitted from the mobile terminal 190 to the signal reading device 200 using electromagnetic coupling. The serial signal is received by the differential receiver 212 using the coil 202. The differential receiver 212 inputs the received serial signal to the amplifier 214. The amplifier 214 is provided in order to amplify the signal level of the serial signal, the level having been lowered by the signal transmission by electromagnetic coupling. The serial signal that has been amplified by the amplifier 214 is input to the decoder 216 and the clock regeneration portion 222.

The decoder 216 detects the beginning portion of the data by referring to the header in the input serial signal, decodes the serial signal that was encoded by the Manchester encoding method, and inputs the signal to the S/P conversion portion 218. The S/P conversion portion 218 converts the input serial signal into the parallel signal (P-DATA). The parallel signal that has been converted by the S/P conversion portion 218 is output to the interface 220.

For its part, the clock regeneration portion 222 uses the built-in PLL 224 to regenerate the parallel signal clock from the serial signal clock by referring to a reference clock that is input from the outside. The parallel signal clock that has been regenerated by the clock regeneration portion 222 is input to the decoder 216 and to the timing control portion 226. The timing control portion 226 controls the receiving timing based on the parallel signal clock that is input from the clock regeneration portion 222. The parallel signal clock (P-CLK) that is input to the timing control portion 226 is output to the interface 220.

The interface 220 converts the parallel signal and the parallel signal clock that are input into a signal configuration that is compatible with the external output device. For example, the interface 220 may convert the input parallel signal into an analog RGB signal and a Digital Visual Interface (DVI) signal and output it to the car navigation system 10, the television receiver 20, and the like.

The functional configurations of the mobile terminal 190 and the signal reading device 200 have been explained above. The functions that are described above make it easy for the user to output video and the like to an external output device simply by setting the mobile terminal 190 in place on top of the signal reading device 200. It is therefore possible to output video and the like from the mobile terminal 190 to a large screen. Accordingly, the mobile terminal 190, in addition to its use as a simple communication device for an individual, can also be made to function as a TV telephone that is used by a large number of people.

USE EXAMPLE 2

Data Transmission Method that uses a Power Supply Line

The mobile terminal 190 that is described above uses as the encoding method the Manchester encoding method, which does not contain a direct current component. The encoded signal that does not contain a direct current component can be transmitted by superposing it on the power supply. Accordingly, a technology will be explained that utilizes a power supply line for the mobile terminal 190 that is described above. A mobile terminal 230 is an example of a configuration that uses this technology.

Functional Configuration

Figure 7A:
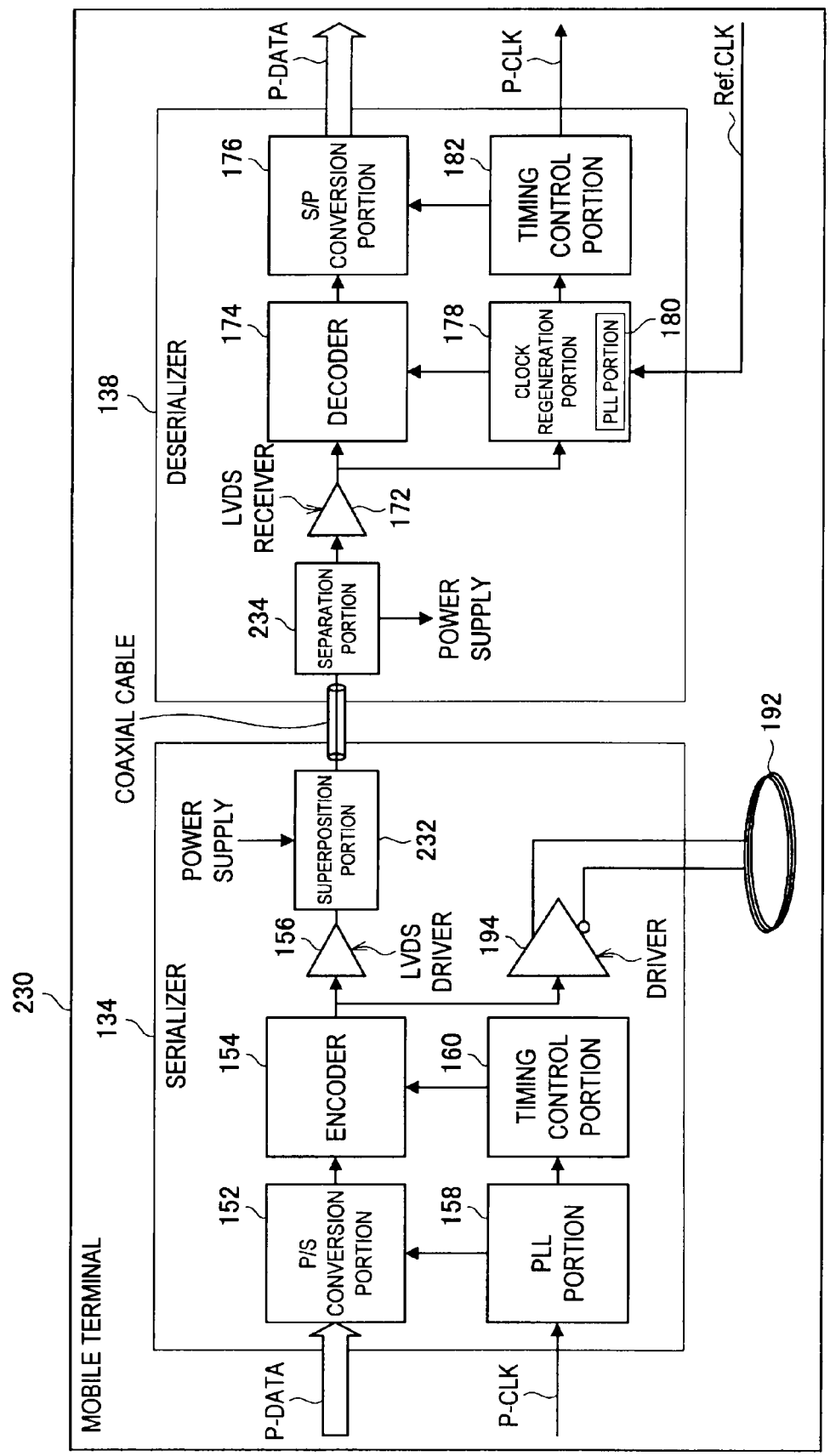
FIG. 7A is an explanatory figure that shows an example of a functional configuration of a mobile terminal that uses serial transmission.

Next, a functional configuration of the mobile terminal 230 that is capable of using the power supply line to transmit data will be explained with reference to FIG. 7A. FIG. 7A is an explanatory figure that shows an example of the functional configuration of the mobile terminal 230 that is capable of using the power supply line to transmit data. However, FIG. 7A is an explanatory figure that mainly illustrates the functional configurations of the serializer 134 and the deserializer 138, so descriptions of the other configuring elements will be omitted. Note also that configuring elements of the mobile terminal 230 that have substantially the same function as in the mobile terminal 190 that has already been described are denoted by the same reference numerals and detailed explanations will be omitted.

Serializer 134

As shown in FIG. 7A, the serializer 134 is configured from the P/S conversion portion 152, the encoder 154, the LVDS driver 156, the PLL 158, the timing control portion 160, the driver 194, and a superposition portion 232.

As shown in FIG. 7A, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 154. The encoder 154 appends a header and the like to the serial signal, encodes the serial signal by a method with no (or little) direct current component, such as the Manchester encoding method or the like, and inputs the signal to the LVDS driver 156 and the driver 194.

The LVDS driver 156 turns the input serial signal into LVDS and inputs it to the superposition portion 232. The superposition portion 232 takes the signal that has been input from the LVDS driver 156 and transmits it to the deserializer 138 by superposing it on the power supply line. For example, the superposition portion 232 may couple the signal and the power supply using a capacitor for the signal and a choke coil for the power supply. Note that a coaxial cable, for example, may be used as the transmission path for the power supply line. Note also that the power supply line is a path that is provided in order to supply electric power from the operation portion 108 to the display portion 102. For its part, the driver 194, using electromagnetic coupling by the coil 192, transmits the input serial signal to the signal reading device 200.

Incidentally, the parallel signal clock that is input to the serializer 134 is input to the PLL 158. The PLL 158 generates a serial signal clock from the parallel signal clock and inputs it to the P/S conversion portion 152 and to the timing control portion 160. The timing control portion 160 controls the timing of the transmission of the serial signal by the encoder 154, based on the serial signal clock that is input.

Deserializer 138

As shown in FIG. 7A, the deserializer 138 is mainly configured from the LVDS receiver 172, the decoder 174, the S/P conversion portion 176, the clock regeneration portion 178, the PLL 180, the timing control portion 182, and a separation portion 234.

Figure 7B:
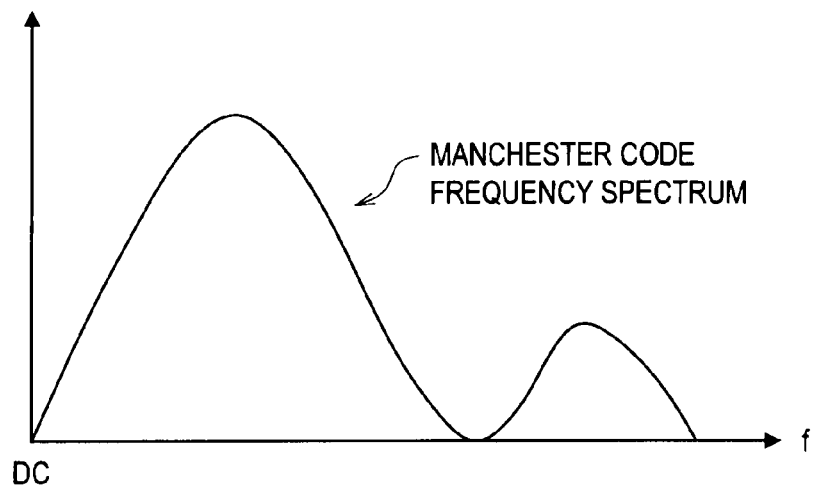
FIG. 7B is an explanatory figure that shows an example of a frequency spectrum for a Manchester code.

As shown in FIG. 7A, the signal in which the serial signal is superposed on the power supply is transmitted to the deserializer 138 through the power supply line (the coaxial cable). The frequency spectrum of the superposed signal is like that in FIG. 7B. As shown in FIG. 7B, the frequency spectrum of the Manchester code does not have a direct current component, so the signal can be transmitted together with the (DC) power supply.

Refer once again to FIG. 7A. The superposed signal that is described above is separated into the serial signal and the power supply by the separation portion 234. For example, the separation portion 234 may extract the serial signal by using a capacitor to cut the direct current component and may extract the power supply by using a choke coil to cut the high-frequency component. The serial signal that has been separated by the separation portion 234 is received by the LVDS receiver 172.

The serial signal that is received by the LVDS receiver 172 is input to the decoder 174 and to the clock regeneration portion 178. The decoder 174 detects the beginning portion of the data by referring to the header in the input serial signal, decodes the serial signal that was encoded by the Manchester encoding method, and inputs the signal to the S/P conversion portion 176. The S/P conversion portion 176 converts the input serial signal into the parallel signal (P-DATA). The parallel signal that has been converted by the S/P conversion portion 176 is output to the LCD 104.

For its part, the clock regeneration portion 178 uses the built-in PLL 180 to regenerate the parallel signal clock from the serial signal clock by referring to a reference clock that is input from the outside. The parallel signal clock that has been regenerated by the clock regeneration portion 178 is input to the decoder 174 and to the timing control portion 182. The timing control portion 182 controls the receiving timing based on the parallel signal clock that is input from the clock regeneration portion 178. The parallel signal clock (P-CLK) that is input to the timing control portion 182 is output to the LCD 104.

In this manner, the mobile terminal 230 that is described above can transmit the power supply and the serial signal (a video signal or the like) through a single coaxial cable. The operation portion 108 and the display portion 102 are therefore connected by only one cable, making it possible to increase the movability of the display portion 102 and to transform the mobile terminal 230 into a complicated shape. This broadens the range of uses for the mobile terminal 230 and also improves convenience for the user.

Summary of Issues 1

As explained above, a parallel transmission method like that of the mobile terminal 100 that is described above is not well suited to freely changing the positional relationship of the operation portion 108 and the display portion 102. Accordingly, providing the serializer 134 and the deserializer 138, as in the mobile terminal 130 that is described above, makes serial transmission of a video signal and the like possible and increases the range of movement of the display portion 102. Furthermore, the problem of the small size of the text characters, video images, and the like that are displayed on the LCD 104 has been solved by using electromagnetic coupling, as in the mobile terminal 190, to enable output to a large external screen. In addition, the movability of the display portion 102 has been increased by using a method that superposes the signal on the power supply line for transmission, taking advantage of the characteristics of the encoding method that is used by the mobile terminal 190.

However, as shown in FIGS. 3, 5, 6, and 7A, in the mobile terminals 130, 190, and 230, and in the signal reading device 200, the PLLs 180 and 224 are used in order to regenerate the clock from the received serial signal. The PLLs are necessary in order to extract the clock from the signal that has been encoded by the Manchester encoding method. However, because the amount of electric power that is consumed by the PLLs themselves is not small, providing the PLLs increases the electric power that is consumed by the mobile terminals 130, 190, and 230, and by the signal reading device 200, to that extent. This increase in the amount of electric power that is consumed is an extremely serious problem for a small device such as a mobile telephone or the like.

Against the backdrop of this problem, demand has grown for a technology that will allow the deserializer 138 and the signal reading device 200 to be configured without providing them with the PLLs. Accordingly, a new signal transmission method has been proposed that addresses these technical issues and transmits a signal using a code that does not contain a direct current component and also does not require a PLL circuit when the clock is regenerated. In the explanation that follows, this signal transmission method is simply called the new method in some cases.

Basic Technology: New Method

The new signal transmission method (the new method) that transmits a signal using a code that does not contain a direct current component and does not require a PLL circuit when the clock is regenerated will be explained below. First the basic Alternate Mark Inversion (AMI) code will be briefly explained before the encoding method of the new method is explained. Then a functional configuration of a mobile terminal 300 according to the new method and the encoding method will be explained.

Signal waveform of the AMI Code

Figure 8:
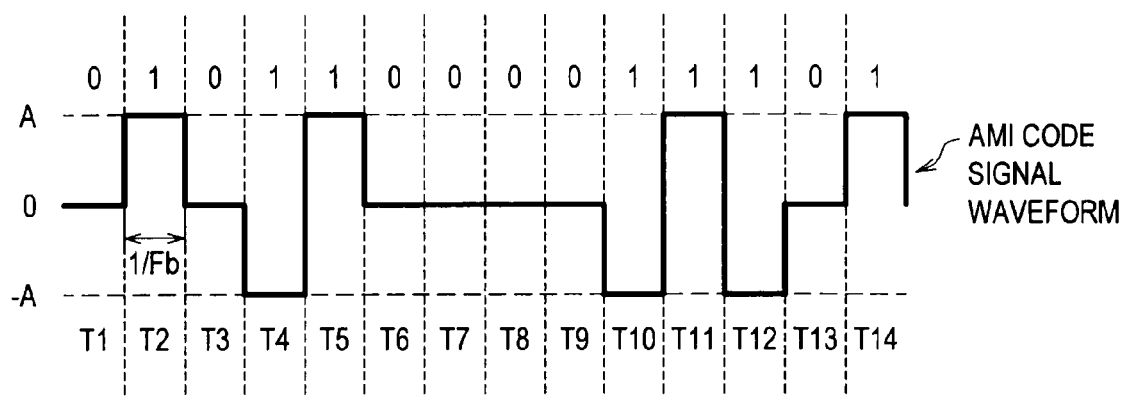
FIG. 8 is an explanatory figure that shows an example of a signal waveform of an AMI code.

First, the signal waveform and the characteristics of the AMI code will be briefly explained with reference to FIG. 8. FIG. 8 is an explanatory figure that shows an example of the signal waveform of the AMI code. However, in the explanation that follows, A will be treated as any positive number.

The AMI code is a code that uses an electrical potential of zero to express a data value of zero and potentials of A and −A to express a data value of 1. Note, however, that the potential A and the potential −A are used alternately. That is, after a data value of 1 has been expressed by the potential A, if the next data bit is also a 1, that 1 will be expressed by the potential −A. Because the data values are expressed by repeatedly inverting the polarity in this manner, the AMI code does not contain a direct current component. Note that other codes with the same type of characteristics as the AMI code include, for example, the partial response code that expresses the data as PR (1, −1), PR (1, 0, −1), PR (1, 0, . . . , −1), and the like. Signal codes that use this sort of polarity inversion are called bipolar codes. A dicode method or the like can also be used. An AMI code with a 100% duty factor will be used as an example in explaining the new method.

FIG. 8 schematically illustrates an AMI code with bit intervals T1 to T14. In FIG. 8, a data value of 1 is expressed at bit intervals T2, T4, T5, T10, T11, T12, and T14. Because the potential is A at bit interval T2, the potential at bit interval T4 is −A. Then at bit interval T5, the potential is A. Thus the amplitude that corresponds to a data value of 1 is alternately inverted between positive and negative values. This is the polarity inversion that is described above.

In contrast, a data value of zero is always expressed by a potential of zero. This form of expression prevents the AMI code from containing a direct current component, but it sometimes results in consecutive potentials of zero, as seen in bit intervals T6 to T9 in FIG. 8. The consecutive potentials of zero make it difficult to extract the clock from the signal waveform without using a PLL. Accordingly, the new method uses a technology that includes a clock component in the AMI code (or in a code that has equivalent characteristics) before transmitting the signal.

Functional Configuration

Figure 9:
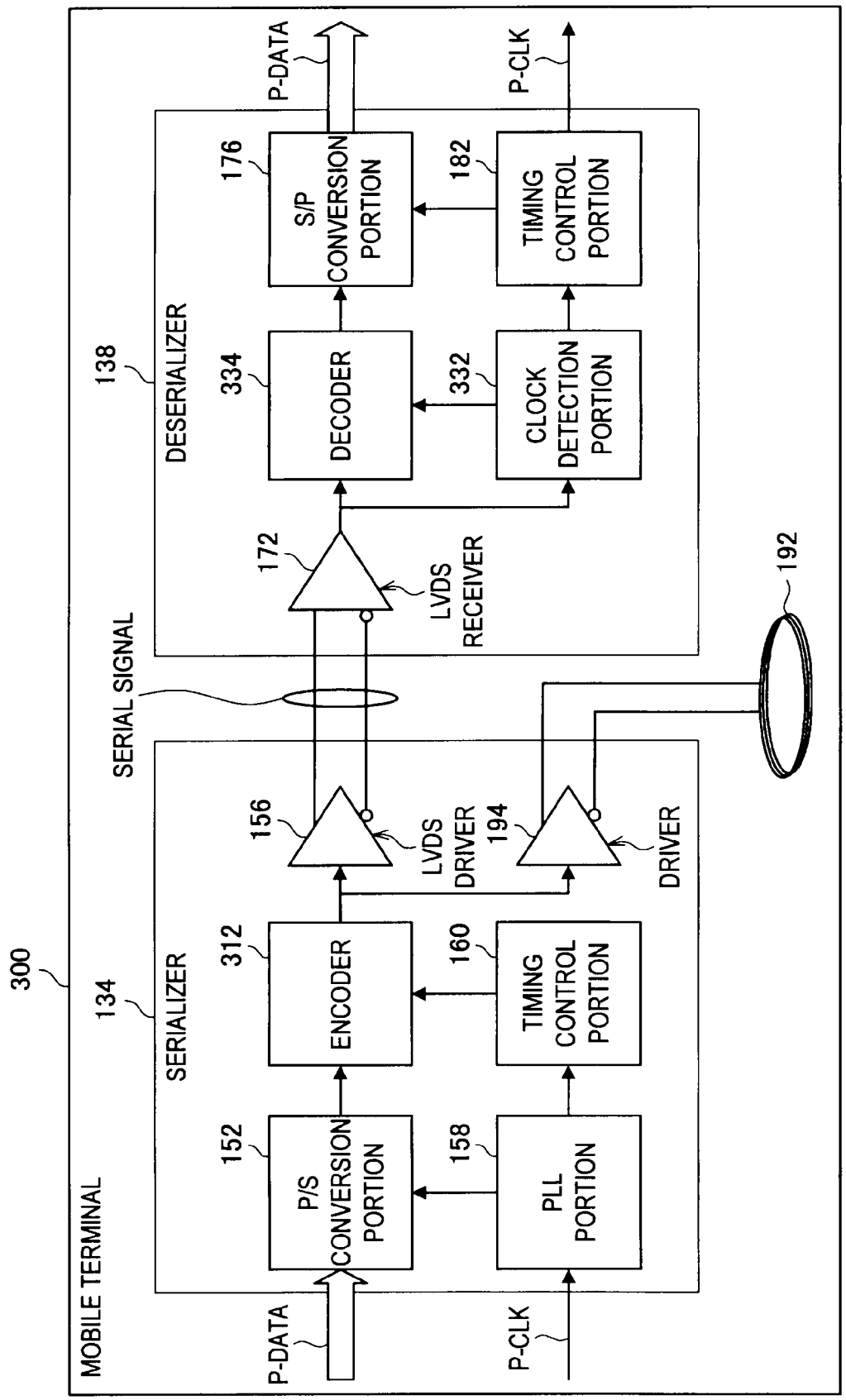
FIG. 9 is an explanatory figure that shows an example of a functional configuration of a mobile terminal that uses a new method.

Next, a functional configuration of the mobile terminal 300 according to the new method will be explained with reference to FIG. 9. FIG. 9 is an explanatory figure that shows an example of the functional configuration of the mobile terminal 300 according to the new method. However, FIG. 9 is an explanatory figure that mainly illustrates the functional configurations of the serializer 134 and the deserializer 138, so descriptions of the other configuring elements will be omitted. Note also that configuring elements of the mobile terminal 300 that have substantially the same function as in the mobile terminal 190 that has already been described are denoted by the same reference numerals and detailed explanations will be omitted.

Serializer 134

As shown in FIG. 9, the serializer 134 is configured from the P/S conversion portion 152, the LVDS driver 156, the PLL 158, the timing control portion 160, the driver 194, and an encoder 312. The main point of difference from the mobile terminal 190 that was described earlier is in the function of the encoder 312.

As shown in FIG. 9, the parallel signal (P-DATA) and the parallel signal clock (P-CLK) are input from the BBP 110 to the serializer 134. The parallel signal that is input to the serializer 134 is converted into a serial signal by the P/S conversion portion 152. The serial signal that has been converted by the P/S conversion portion 152 is input to the encoder 312. The encoder 312 appends a header and the like to the serial signal and encodes the serial signal by a specified encoding method.

Figure 10:
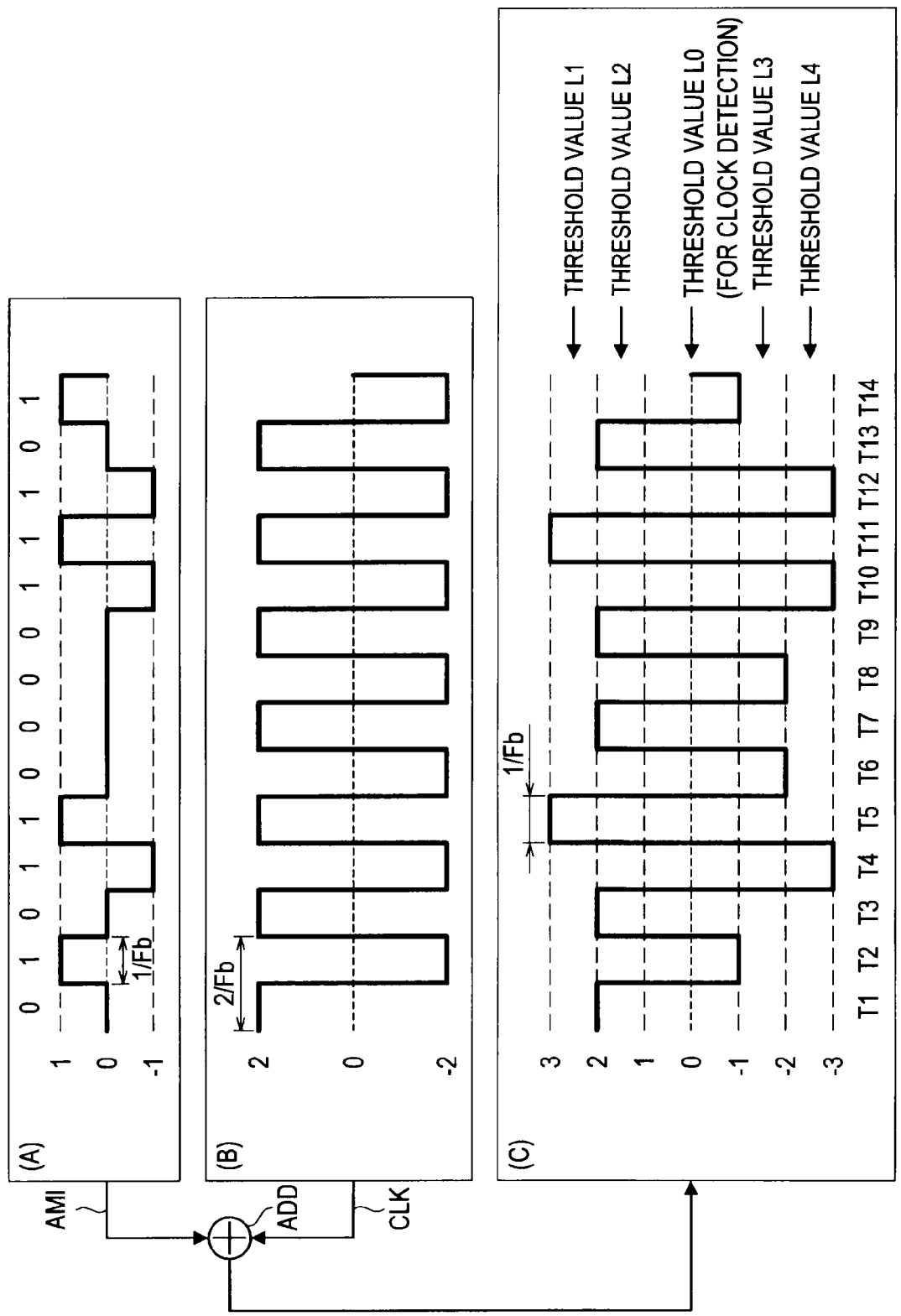
FIG. 10 is an explanatory figure that shows a signal generation method according to the new method.
Figure 11:
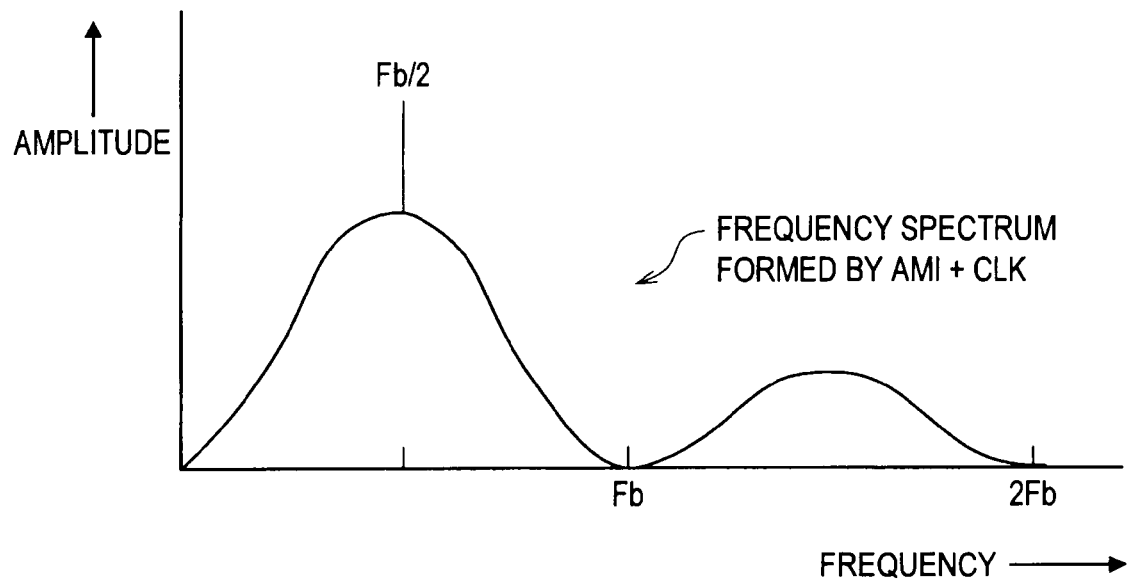
FIG. 11 is an explanatory figure that shows an example of a frequency spectrum for a signal according to the new method.

Next, a method for generating the encoded signal in the encoder 312 will be explained with reference to FIG. 10. FIG. 10 is an explanatory figure that shows an example of the encoding method according to the new method. Note that FIG. 10 illustrates a method of generating a code for which the AMI code serves as a base. However, the new method is not limited to using the AMI code as a base, and any code that has the same characteristics as the AMI code may also be used in the same manner. For example, a bipolar code, a code according to a partial response method, and the like can also be used.

The signal that is shown in (C) in FIG. 10 is a signal that has been encoded by the encoding method of the new method. In the signal, data values of 1 are expressed by a plurality of potentials A1 (−1, −3, 1, 3), and data values of zero are expressed by a plurality of potentials A2 (−2, 2) that are different from the potentials A1. Note that the signal is configured such that the polarities are inverted and is also configured such that the same potential does not occur consecutively. For example, referring to the portion where the zero data values occur consecutively in the bit intervals T6 to T9, the potentials are −2, 2, −2, and 2. Using this sort of code makes it possible for the clock component to be regenerated by detecting both the rising and the falling edges, even if the same data value occurs consecutively.

Because the encoder 312 generates a code like that described above, an adder ADD is provided. As shown in FIG. 10, the encoder 312 may take the serial signal that is input, encode it into the AMI code (A), for example, and input it to the adder ADD. The encoder 312 also generates a clock (B) that has a frequency (2/Fb) that is half of the transmission speed Fb of the AMI code and then inputs the clock to the adder ADD. Note that the clock amplitude is N times that of the AMI code (N>1; N=2 in the example in FIG. 10). The encoder 312 then generates the signal (C) by using the adder ADD to add the AMI code and the clock. At this time, the AMI code and the clock are synchronized, and their edges are aligned when they are added.

Refer once again to FIG. 9. The serial signal that has been encoded by the encoder 312 is input to the LVDS driver 156 and the driver 194. The LVDS driver 156 transmits the input serial signal to the deserializer 138 by a differential transmission method according to LVDS. For its part, the driver 194, using electromagnetic coupling by the coil 192, transmits the input serial signal to the signal reading device 200. Note that the configuring elements for transmitting the signal to the signal reading device 200 may be omitted as necessary according to the embodiment.

In contrast, the parallel signal clock that is input to the serializer 134 is input to the PLL 158. The PLL 158 generates a serial signal clock from the parallel signal clock and inputs it to the P/S conversion portion 152 and to the timing control portion 160. The timing control portion 160 controls the timing of the transmission of the serial signal by the encoder 312, based on the serial signal clock that is input.

Deserializer 138

As shown in FIG. 9, the deserializer 138 is mainly configured from the LVDS receiver 172, the S/P conversion portion 176, the timing control portion 182, a clock detection portion 332, and a decoder 334. The main point of difference from the mobile terminal 190 that was described earlier is in the clock detection portion 332, which does not have a PLL.

As shown in FIG. 9, the serial signal is transmitted from the serializer 134 to the deserializer 138 by the differential transmission method according to LVDS. The serial signal is received by the LVDS receiver 172. The serial signal that is received by the LVDS receiver 172 is input to the decoder 334 and to the clock detection portion 332. The decoder 334 detects the beginning portion of the data by referring to the header in the input serial signal and decodes the serial signal that was encoded by the encoding method that is used by the encoder 312.

Next, the method of decoding by the decoder 334 will be explained with reference to FIG. 10. As explained above, the serial signal is encoded by the encoder 312 into the form that is shown in (C) in FIG. 10. Accordingly, the decoder 334 can decode the original serial signal by determining whether the amplitude of the signal is A1 or A2.

Four threshold values (L1, L2, L3, L4) that are shown in (C) in FIG. 10 are used to determine whether the amplitude is A1 (−1, −3, 1, 3), which corresponds to a data value of 1, or A2 (−2, 2), which corresponds to a data value zero. Accordingly, the decoder 334 compares the amplitude of the input serial signal to the four threshold values described above and determines whether the amplitude is A1 or A2, then decodes the original serial signal. The decoding processing will be described in detail at a later stage (refer to FIGS. 12 to 15).

Refer once again to FIG. 9. The serial signal that has been decoded by the decoder 334 is input to the S/P conversion portion 176. The S/P conversion portion 176 converts the input serial signal into the parallel signal (P-DATA). The parallel signal that has been converted by the S/P conversion portion 176 is output to the LCD 104.

For its part, the clock detection portion 332 detects the clock component in the input serial signal. As has already been explained, using the code that is shown in (C) in FIG. 10 makes it possible for the clock component to be detected based on the cycle of the polarity inversion, the polarity of the amplitude being determined by comparing the amplitude to a threshold value L0 (a potential of zero). Therefore, the clock detection portion 332 can detect the clock component of the signal without using a PLL. This makes it possible to reduce the amount of electric power that is consumed by the deserializer 138.

Refer once again to FIG. 9. The clock that is detected by the clock detection portion 332 is input to the decoder 334 and the timing control portion 182. The timing control portion 182 controls the receiving timing based on the clock that is input from the clock detection portion 332. The clock (P-CLK) that is input to the timing control portion 182 is output to the LCD 104.

Thus, using a code that does not contain a direct current component (refer to FIG. 11) and from which the clock component can be regenerated based on the polarity inversion cycle makes it possible to perform the clock detection without using a PLL, greatly reducing the amount of electric power that the mobile terminal consumes. Note that the frequency spectrum for the code that is used by the new method may take a form like that shown in FIG. 11, for example. A line spectrum is evident in the clock frequency Fb/2 that is added by the adder ADD of the encoder 312, in addition to which the broad frequency spectrum of the AMI code is also present. Note that in this frequency spectrum, null points exist at the frequencies Fb, 2Fb, 3Fb, and the like.

The technology according to the new method can also be applied to configurations like those in the mobile terminals 130, 190, and 230 and the signal reading device 200 that are described above. In other words, the technology can also be applied to an electronic device that uses a method of transmitting signals by one of the electric power line transmission method and electromagnetic coupling. If the new method were to be applied to these sorts of electronic devices, the PLL could be omitted from the deserializer 138 that is mounted in each of the devices.

Details of Decoding Processing

Figure 12:
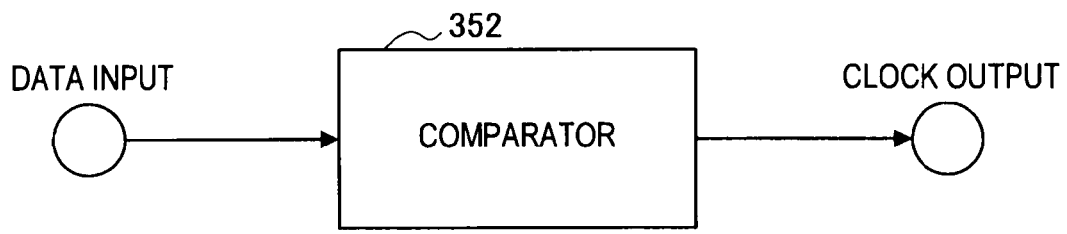
FIG. 12 is an explanatory figure that shows an example of a circuit configuration of a clock detection portion.
Figure 13:
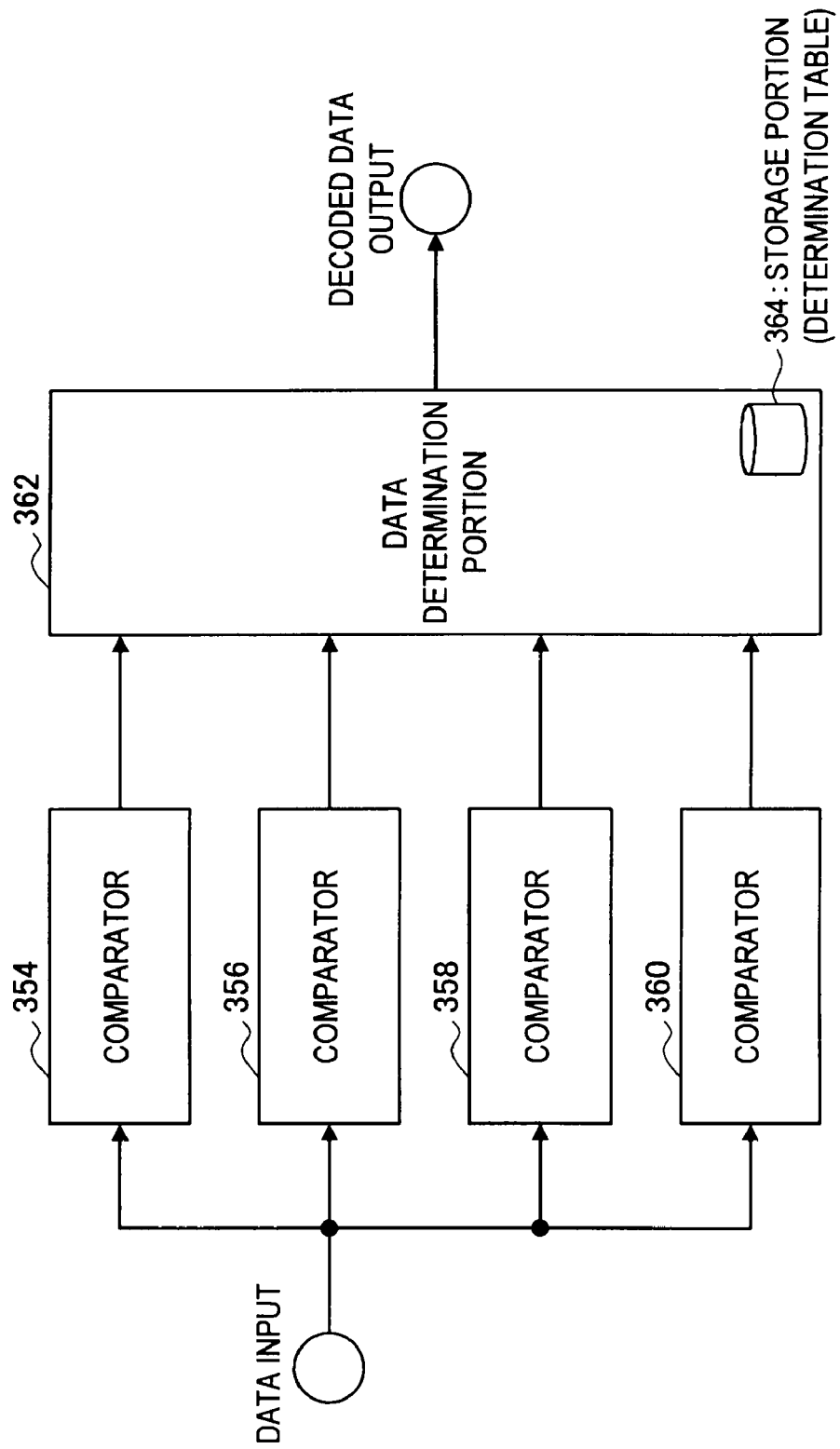
FIG. 13 is an explanatory figure that shows an example of a circuit configuration of a decoder.
Figure 15:
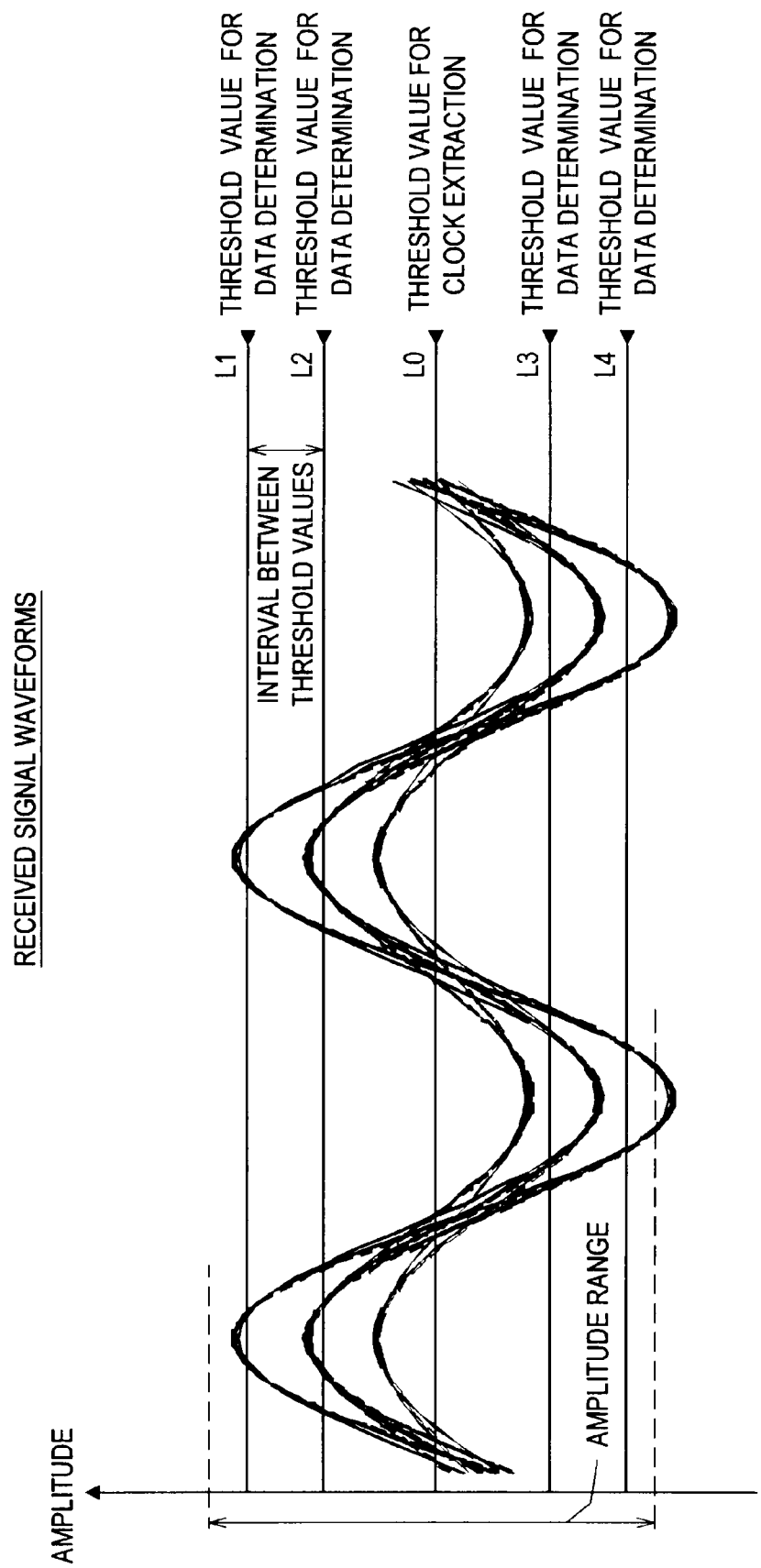
FIG. 15 is an explanatory figure that shows relationships between received signal waveforms and threshold values for data determination.

Next, the details of the decoding processing in the new method will be explained with reference to FIGS. 12 to 15. FIG. 12 is an explanatory figure that shows an example of a circuit configuration of the clock detection portion 332. FIG. 13 is an explanatory figure that shows an example of a circuit configuration of the decoder 334. FIG. 14 is an explanatory figure that shows an example of a configuration of a determination table for data determination. FIG. 15 is an explanatory figure that shows received signal waveforms (an eye pattern is shown in the drawing) in a case where the new method is used.

Example of Circuit Configuration of the Clock Detection Portion 332

First, refer to FIG. 12. As shown in FIG. 12, the function of the clock detection portion 332 is implemented in a comparator 352.

The amplitude values of the signal that has been encoded by the new method are input as input data to the comparator 352. Once the input data have been input, the comparator 352 compares the input values to a specified threshold value. For example, the comparator 352 may determine whether or not the input values are greater than the specified threshold value. The comparator 352 is provided to extract the clock based on the code of the new method (refer to (C) in FIG. 10). Therefore, the threshold value L0 is used as the specified threshold value.

For example, in a case where the input value is greater than the specified threshold value, the comparator 352 may output a determination value (for example, 1) that indicates that the input value is greater than the specified threshold value. On the other hand, in a case where the input value is less than the specified threshold value, the comparator 352 may output a determination value (for example, zero) that indicates that the input value is not greater than the specified threshold value. The results that are output by the comparator 352 are input as the clock to the decoder 334 and the timing control portion 182.

Example of circuit Configuration of the Decoder 334

Next, refer to FIG. 13. As shown in FIG. 13, the function of the decoder 334 is implemented in a plurality of comparators 354, 356, 358, 360 and in a data determination portion 362. Further, a storage portion 364 is provided in the data determination portion 362. The determination table for data determination that is shown in FIG. 14 is stored in the storage portion 364.

A different threshold value is set for each of the plurality of comparators 354, 356, 358, 360. For example, the threshold value L1 may be set for the comparator 354, the threshold value L2 may be set for the comparator 356, the threshold value L3 may be set for the comparator 358, and the threshold value L4 may be set for the comparator 360. However, as shown in (C) in FIG. 10, the relationships among the threshold values L1, L2, L3, L4 must satisfy the condition L1>L2>L3>L4.

First, the amplitude values of the signal that has been encoded by the new method are input as input data to the plurality of comparators 354, 356, 358, 360. At this time, the same input data are input in parallel to the plurality of comparators 354, 356, 358, 360.

Once the input data have been input, the comparator 354 compares the input values to the threshold value L1 and determines whether or not the input values are greater than the threshold value L1. In a case where the input value is greater than the threshold value L1, the comparator 354 outputs a determination value (for example, 1) that indicates that the input value is greater than the threshold value L1. On the other hand, in a case where the input value is less than the threshold value L1, the comparator 354 outputs a determination value (for example, zero) that indicates that the input value is not greater than the threshold value L1.

In the same manner, the comparator 356 compares the input values to the threshold value L2 and determines whether or not the input values are greater than the threshold value L2. The comparator 358 compares the input values to the threshold value L3 and determines whether or not the input values are greater than the threshold value L3. The comparator 360 compares the input values to the threshold value L4 and determines whether or not the input values are greater than the threshold value L4. The determination results that are output from the plurality of comparators 354, 356, 358, 360 are input to the data determination portion 362.

Based on the determination results that are output from the plurality of comparators 354, 356, 358, 360, the data determination portion 362 determines the bit values that are indicated by the input data. In this process, the data determination portion 362 refers to the determination table for data determination (refer to FIG. 14) that is stored in the storage portion 364 and based on the determination table, determines the bit values that are indicated by the input data.

The table that is shown in FIG. 14, for example, may be used as the determination table for data determination. As shown in the example in FIG. 14, in the determination table, a bit value (zero or 1) is associated with each combination of the values that are output from the plurality of comparators 354, 356, 358, 360.

Consider, for example, a case in which the output value from the comparator 354 is 1. In this case, the input value is greater than the threshold value L1. As explained above, the relationship among the threshold values is defined as L1>L2>L3>L4. Based on this relationship, the output values from the comparators 356, 358, 360 must also be 1. Referring to (C) in FIG. 10, the bit value that corresponds to the amplitude that has a value that is greater than the threshold value L1 is 1. Therefore, in the determination table, a bit value of 1 is associated with the combination in which all of the output values from the comparators 354, 356, 358, 360 are 1.

Consider other conditions as well. For the purposes of this discussion, the output values from the comparators 354, 356, 358, 360 are respectively called d1, d2, d3, d4, and the combination of the output values is expressed as (d1, d2, d3, d4). For example, if the combination (d1, d2, d3, d4) is (0, 1, 1, 1), it means that an input data value d satisfies the condition L1>d>L2. Referring to (C) in FIG. 10, in a case where the input data value d satisfies the condition L1>d>L2, the bit value is zero.

In the same manner, if the combination (d1, d2, d3, d4) is (0, 0, 1, 1), it means that the input data value d satisfies the condition L2>d>L3. Referring to (C) in FIG. 10, in a case where the input data value d satisfies the condition L2>d>L3, the bit value is 1. If the combination (d1, d2, d3, d4) is (0, 0, 0, 1), it means that the input data value d satisfies the condition L3>d>L4. Referring to (C) in FIG. 10, in a case where the input data value d satisfies the condition L3>d>L4, the bit value is zero. If the combination (d1, d2, d3, d4) is (0, 0, 0, 0), it means that the input data value d satisfies the condition L4>d. Referring to (C) in FIG. 10, in a case where the input data value d satisfies the condition L4>d, the bit value is 1.

Thus the combinations of the output values that are output individually from the comparators 354, 356, 358, 360 can be associated with specific bit values, and the determination table that is shown in FIG. 14 is an example of the correspondence relationships between the combinations and the bit values, summarized in the form of a table. The data determination portion 362 refers to this sort of determination table and determines the bit values based on the combinations of the output values that are output from the plurality of comparators 354, 356, 358, 360. The bit values that are determined by the data determination portion 362 are input to the S/P conversion portion 176.

Summary of Issues 2

Because the code that is used in the new method provides specific advantages in that it does not contain a direct current component and makes it possible for the clock to be regenerated without using a PLL. Therefore, as in the mobile terminal 300 that is described above, it is not necessary to provide a PLL on the receiving side, even if the signal can be transmitted by superposing it on the direct current power supply or the like, as it is in the mobile terminal 230 that is described above. Note that the technology of the new method that has been explained using the configuration of the mobile terminal 300 as an example is a technology that pertains to one-way signal transmission.

Incidentally, in recent mobile terminals and the like, various devices in addition to the LCD 104 are provided in the display portion 102 that is a configuring element of the mobile terminal. For example, a touch panel is sometimes provided in the LCD 104, and a camera, operation switches, and the like are also sometimes provided. Therefore, in these sorts of portable devices and the like, not only is image data transmitted to the LCD 104, but various types of data are also transmitted from the display portion 102 to the operation portion 108. In other words, in these sorts of mobile terminals and the like, data is transmitted bidirectionally between the display portion 102 and the operation portion 108.

However, if the PLL circuit is omitted from the operation portion 108 by using the code for the new method that is described above, the clock that is used in transmitting data from the operation portion 108 to the display portion 102 cannot be generated. On the other hand, if the PLL circuit is provided in the operation portion 108, the problems of the increased amount of electric power that is consumed, the larger scale of the circuit, and the like occur, as described earlier (in the Summary of issues 1). Accordingly, there is demand for a technology that, based on the premise that the code of the new method that is described above will be used, makes it possible to transmit data from the operation portion 108 to the display portion 102 without providing a PLL circuit in the operation portion 108.

Addressing these technological issues, an embodiment that will be described below implements bidirectional transmission without providing a PLL circuit in the operation portion 108. Of course, the embodiment that will be explained below also resolves the issues that were described earlier (in the Summary of issues 1). The embodiment that makes it possible to achieve these objectives will be explained below.

Embodiment

The embodiment of the present invention will be explained. The present embodiment proposes a bidirectional transmission method in which, without a PLL circuit being provided, the clock is extracted from the signal that is transmitted from the operation portion 108 to the display portion 102 and the extracted clock is used in transmitting a signal from the display portion 102 to the operation portion 108.

Example of Configuration of Mobile Terminal 400

Figure 16:
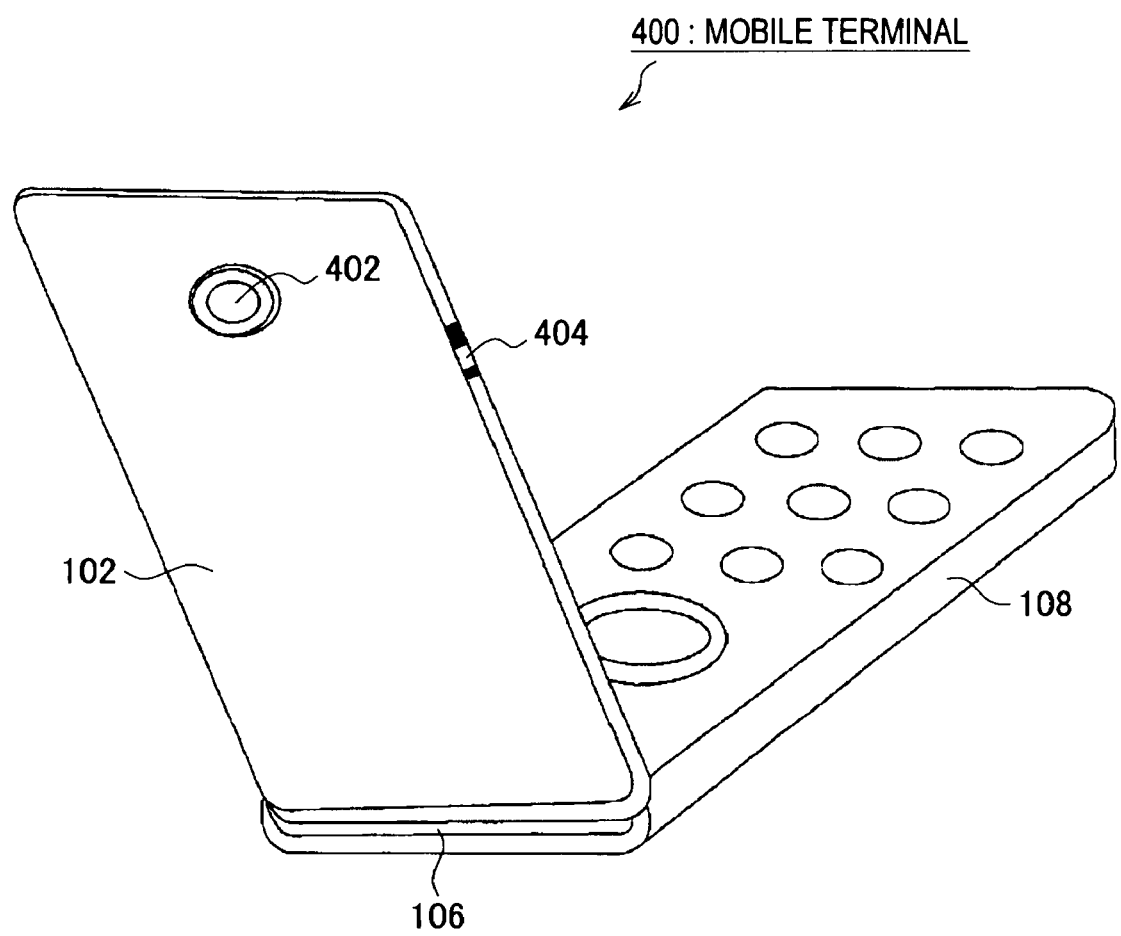
FIG. 16 is an explanatory figure that shows an example of a configuration of a mobile terminal according to an embodiment of the present invention.
Figure 17:
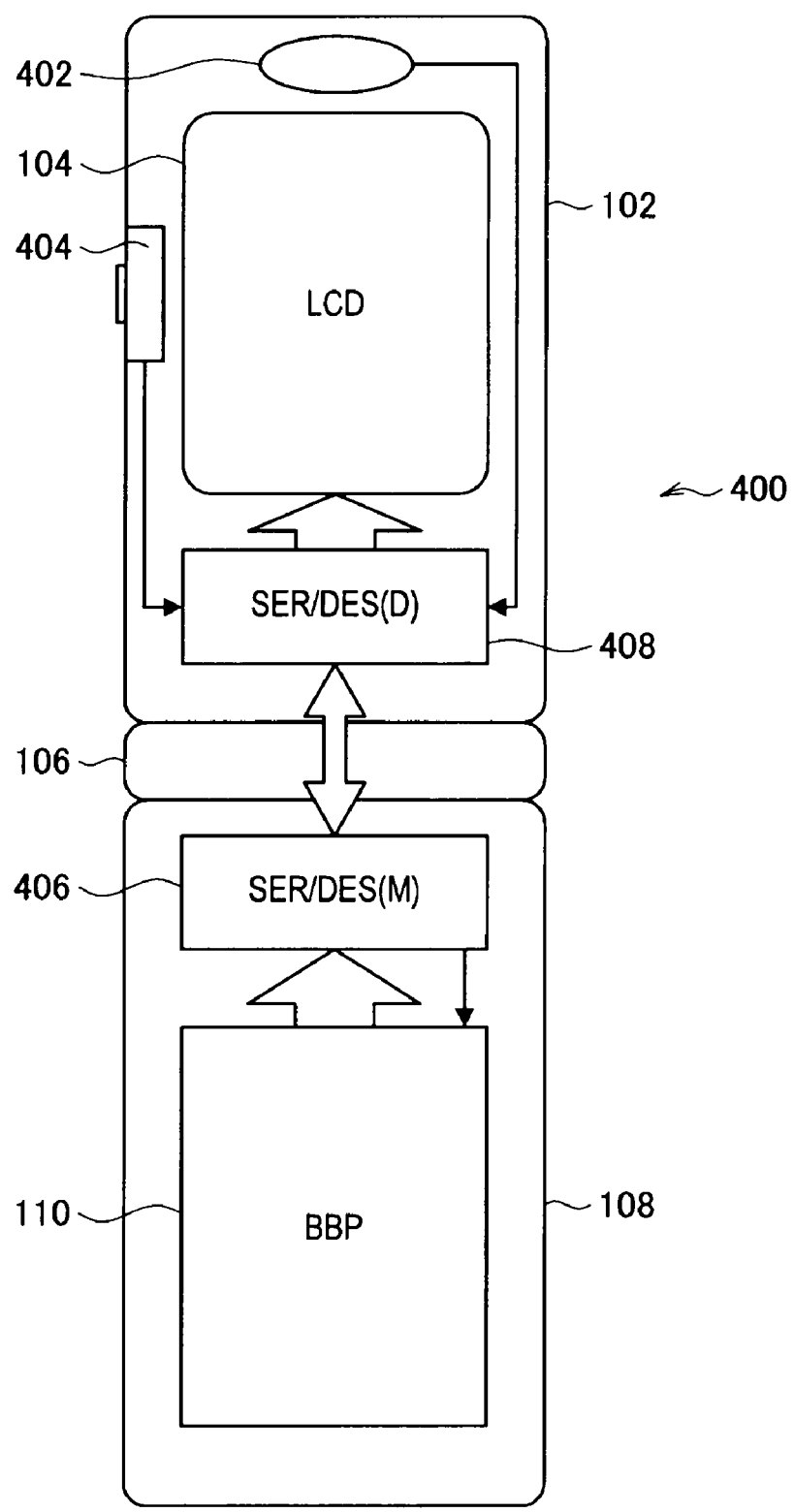
FIG. 17 is an explanatory figure that shows an example of a configuration of a mobile terminal according to the present embodiment.
Figure 18:
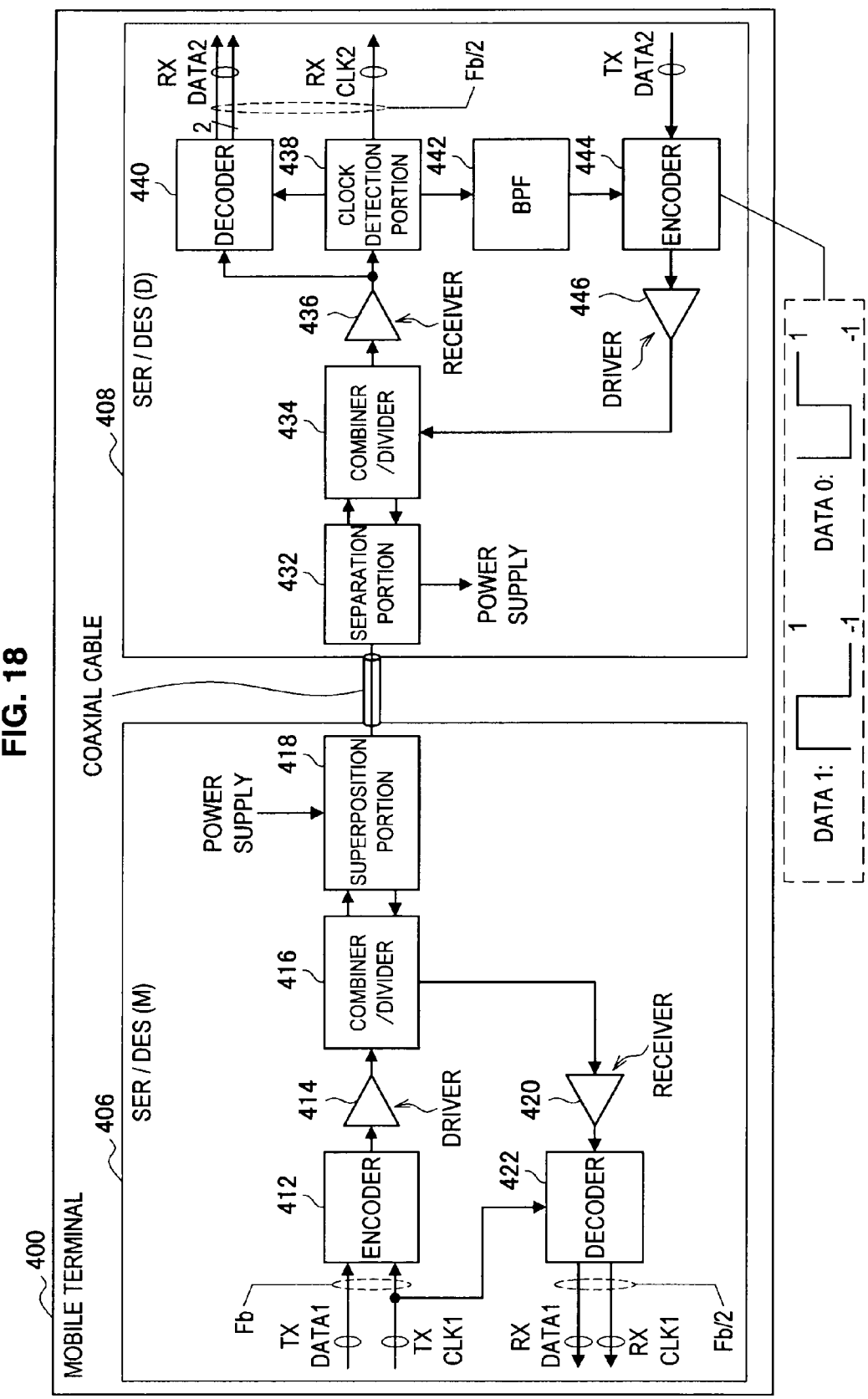
FIG. 18 is an explanatory figure that shows an example of a functional configuration of a mobile terminal according to the present embodiment.

A functional configuration of the mobile terminal 400 according to the present embodiment will be explained below with reference to FIGS. 16 to 18. FIG. 16 is an explanatory figure that shows an external appearance of the mobile terminal 400 according to the present embodiment. FIG. 17 is an explanatory figure that shows an example of a configuration of the mobile terminal 400 according to the present embodiment. FIG. 18 is an explanatory figure that shows an example of a functional configuration of the mobile terminal 400 according to the present embodiment. Note that configuring elements that have substantially the same function as in the mobile terminals 130, 190, 230, 300 that are described above are denoted by the same reference numerals and duplicate explanations will be omitted.

Need for Bidirectional Transmission

Refer to FIG. 16. The mobile terminal 400 that is shown in FIG. 16 is mainly configured from the display portion 102, the connecting portion 106, and the operation portion 108. Further, an image acquisition portion 402 and an operation switch 404 are provided in the display portion 102. The mobile terminal 400 is an example of a configuration in which the bidirectional transmission of data between the display portion 102 and the operation portion 108 is required. Note that the configuration is the same even in a case where a touch panel or the like is provided in the display portion 102.

In the same manner as the mobile terminal 130 that is shown in FIG. 2, the LCD 104 is provided in the display portion 102 of the mobile terminal 400, and it displays images and the like. The data for the images is transmitted to the display portion 102 from the operation portion 108. The image acquisition portion 402 that is provided in the display portion 102 provides a camera function for photographing a subject. In addition, the operation switch 404 that is provided in the display portion 102 is an operation portion that may be used for switching between a tune selection function and a shuffle function when the mobile terminal 400 is used as a music player, for example. The operation switch 404 may also be used as a switch for switching the mobile terminal 400 to silent mode, a shutter switch, and the like.

The data for an image that is acquired by the image acquisition portion 402 is transmitted from the display portion 102 to the operation portion 108. In the same manner, an operation signal that is output by an operation of the operation switch 404 is transmitted from the display portion 102 to the operation portion 108. Thus, in an electronic device like the mobile terminal 400, the data transmission is carried out bidirectionally between the display portion 102 and the operation portion 108. Therefore, the mobile terminal 400 according to the present embodiment uses serial communication in the transmission path that passes through the connecting portion 106 and implements bidirectional transmission even as it ensures ample range of movement for the connecting portion 106.

Functional Configuration

Next, a functional configuration of the mobile terminal 400 according to the present embodiment will be explained with reference to FIGS. 17 and 18. FIG. 17 is an explanatory figure that shows the overall configuration of the mobile terminal 400 according to the present embodiment. FIG. 18 is an explanatory figure that shows, within the functional configuration of the mobile terminal 400 according to the present embodiment, the main functional configuration for implementing the bidirectional transmission that is described above.

Overall Functional Configuration

First, refer to FIG. 17. As shown in FIG. 17, the LCD 104, the image acquisition portion 402, the operation switch 404, and a serializer/deserializer (SER/DES) 408 are provided in the display portion 102 of the mobile terminal 400. In addition, the BBP 110 and a serializer/deserializer (SER/DES) 406 are provided in the operation portion 108.

One point of difference between the mobile terminal 400 and the mobile terminal 130 that is shown in FIG. 2 is that the image acquisition portion 402 and the operation switch 404 are provided in the display portion 102. Another point of difference is that the serializer 134 and the deserializer 138 in the mobile terminal 130 have respectively been replaced by the serializers/deserializers 406, 408. Note that in the explanation that follows, the serializer/deserializer 406 that is provided in the operation portion 108 is represented as SER/DES (M). In addition, the serializer/deserializer 408 that is provided in the display portion 102 is represented as SER/DES (D).

From the Operation Portion 108 to the Display Portion 102

First, the flow of a signal that goes from the operation portion 108 to the display portion 102 will be explained. A parallel signal of the image data that is displayed on the LCD 104 is generated by the BBP 110. The parallel signal that has been generated by the BBP 110 is converted into a serial signal by the serializer/deserializer 406. The signal that has been serialized by the serializer/deserializer 406 is input to the serializer/deserializer 408 that is provided in the display portion 102 through the serial signal path that passes through the connecting portion 106. The serializer/deserializer 408 converts the serial signal that has been input through the serial signal path into a parallel signal and inputs it to the LCD 104.

From the Display Portion 102 to the Operation Portion 108

Next, the flow of a signal that goes from the display portion 102 to the operation portion 108 will be explained. As explained above, a signal that goes from the display portion 102 to the operation portion 108 may be, for example, a signal for the image data that is acquired by the image acquisition portion 402, an operation signal that is output by an operation of the operation switch 404, or the like. Here, a case in which a signal for image data that is acquired by the image acquisition portion 402 is transmitted will be explained as an example. A parallel signal that is output by the image acquisition portion 402 is converted into a serial signal by the serializer/deserializer 408, and the serial signal is transmitted to the serializer/deserializer 406 of the operation portion 108 through the serial signal path that passes through the connecting portion 106. The serializer/deserializer 406 converts the serial signal that has been input through the serial signal path into a parallel signal and inputs it to the BBP 110.

In the flows that are described above, the mobile terminal 400 implements bidirectional data transmission between the display portion 102 and the operation portion 108. Functional configurations of the serializers/deserializers 406, 408 that implement this sort of bidirectional transmission will be explained in detail below.

Detailed Functional Configurations

Next, refer to FIG. 18. FIG. 18 shows the functional configuration of the mobile terminal 400 with the focus on the serializers/deserializers 406, 408. However, the portion of the configuration that includes the P/S conversion portion 152 and the like and is illustrated in FIG. 9 (the mobile terminal 300) and the like has been omitted. Furthermore, the mobile terminal 400 uses a configuration that transmits the signal by superposing it on the direct current power supply, in the same manner as in the mobile terminal 230 that is shown in FIG. 7A. Of course, the scope of the technology according to the present embodiment is not limited to using the power supply line as the transmission route.

As explained above, the mobile terminal 400 includes the serializer/deserializer 406 (SER/DES (M)) and the serializer/deserializer 408 (SER/DES (D)). Further, the serializers/deserializers 406, 408 are connected by a single signal line (for example, a coaxial cable or the like). The signal line is used as the power supply path for supplying direct current electric power from the operation portion 108 to the display portion 102. Note that in the explanation that follows, SER/DES (M) is represented as simply (M), and SER/DES (D) is represented as simply (D).

As shown in FIG. 18, the serializer/deserializer 406 (M) includes an encoder 412, a driver 414, a combiner/divider 416, a superposition portion 418, a receiver 420, and a decoder 422. The serializer/deserializer 408 (D) includes a separation portion 432, a combiner/divider 434, a receiver 436, a clock detection portion 438, a decoder 440, a band pass filter (BPF) 442, an encoder 444, and a driver 446.

From SER/DES (M) to SER/DES (D)

First, processing that transmits data (TX DATA1) from the serializer/deserializer 406 (M) to the serializer/deserializer 408 (D) will be explained.

As shown in FIG. 18, the transmission data (TX DATA1) and the transmission clock (TX CLK1) are input to the serializer/deserializer 406 (M). The transmission data (TX DATA1) is serialized at the point in time when it is input to the encoder 412. The transmission clock (TX CLK1) is input to the encoder 412 and the decoder 422. When the transmission data (TX DATA1) and the transmission clock (TX CLK1) are input, the encoder 412 encodes the transmission data by adding the transmission clock (TX CLK1) to the transmission data (TX DATA1), in the same manner as in the new method that was described earlier.

In a case where the transmission data (TX DATA1) is expressed in the AMI code and the transmission speed is Fb, the code for the new method is generated by the encoder 412 in the same manner as in (C) in FIG. 10. The code that is generated by the encoder 412 is input to the combiner/divider 416 through the driver 414. The combiner/divider 416 is a unit that divides the signal path that passes through the encoder 412 and the signal path that passes through the decoder 422 in order to implement the bidirectional transmission. Because data transmission is being performed, the code that has been input to the combiner/divider 416 is input to the superposition portion 418.

The direct current power supply is also input to the superposition portion 418. The code that is input to the superposition portion 418 is superposed on the direct current power supply. The superposed signal that has been generated by the superposition portion 418 is then input to the separation portion 432 of the serializer/deserializer 408 (D) through the coaxial cable. The separation portion 432 separates the input superposed signal into the direct current power supply and the code. The direct current power supply that has been separated by the separation portion 432 is supplied to the display portion 102.

In contrast, the code that has been separated by the separation portion 432 is input to the combiner/divider 434. The combiner/divider 434 is a unit that divides the signal path that passes through the decoder 440 and the signal path that passes through the encoder 444 in order to implement the bidirectional transmission. Because data receiving is being performed, the code that has been input to the combiner/divider 434 is input to the clock detection portion 438 and the decoder 440 through the receiver 436. The clock detection portion 438 detects the clock based on the code that is input. In doing so, the clock detection portion 438 detects the clock by using the same method that is used by the clock detection portion 332 in the mobile terminal 300 that is described above.

The clock that has been detected by the clock detection portion 438 is supplied to the LCD 104 and is also input to the decoder 440. However, the frequency of the clock (RX CLK2) that has been detected by the clock detection portion 438 is Fb/2. The decoder 440 uses the clock (RX CLK2) that has been input from the clock detection portion 438 to generate received data (RX DATA2) by performing decoding processing on the code that has been input. The received data (RX DATA2) is 2-bit parallel received data that is synchronized to the clock (RX CLK2) that has been detected by the clock detection portion 438. The received data (RX DATA2) that is generated in this manner by the decoder 440 is input to the LCD 104.

The processing that transmits the data (TX DATA1) from the serializer/deserializer 406 (M) to the serializer/deserializer 408 (D) has been explained. Next, processing that transmits data (TX DATA2) from the serializer/deserializer 408 (D) to the serializer/deserializer 406 (M) will be explained.

From SER/DES (D) to SER/DES (M)

As has already been explained above, a transmission clock is required on the serializer/deserializer 408 (D) side in order to transmit the data (TX DATA2) from the serializer/deserializer 408 (D) to the serializer/deserializer 406 (M). However, if a PLL circuit is provided on the serializer/deserializer 408 (D) side in order to generate the transmission clock, the amount of electric power that is consumed will increase.

Accordingly, a method is implemented in the present embodiment such that the transmission clock is supplied from the serializer/deserializer 406 (M) to the serializer/deserializer 408 (D). Note that the time division duplex (TDD) method is used for the data transmissions between the serializers/deserializers 406, 408. Therefore, timeslots are divided between cases where the data is transmitted in the forward direction from the serializer/deserializer 406 (M) to the serializer/deserializer 408 (D) and cases where the data is transmitted in the reverse direction.

For the data transmission from the serializer/deserializer 406 (M) to the serializer/deserializer 408 (D), the code that is shown in (C) in FIG. 10 is used. Moreover, the serializer/deserializer 406 (M) continues to transmit the clock signal that is shown in (B) in FIG. 10 to the serializer/deserializer 408 (D) even during the time segments when it is not transmitting data. In other words, even during the time segments when the serializer/deserializer 408 (D) is not transmitting data, the clock signal with the frequency Fb/2 and the amplitudes 2 and −2 continues to be transmitted to the serializer/deserializer 408 (D).

Accordingly, when the serializer/deserializer 408 (D) transmits data, it transmits the data using the clock signal that it has received from the serializer/deserializer 406 (M). The clock signal that is transmitted from the serializer/deserializer 406 (M) is input through the separation portion 432, the combiner/divider 434, and the receiver 436. Accordingly, the clock detection portion 438 detects the clock based on the signal that has been input and inputs it to the BPF 442. The clock that is detected by the clock detection portion 438 ordinarily contains considerable jitter. Therefore, the clock that is detected by the clock detection portion 438 is input to the BPF 442 in order to suppress the jitter.

The clock in which the jitter has been suppressed by the BPF 442 is input to the encoder 444. The transmission data (TX DATA2) is also input to the encoder 444. The transmission data (TX DATA2) is encoded by the encoder 444 according to a specified method. Note, however, that the transmission path by which the transmission data (TX DATA2) is transmitted is the same transmission path by which the clock signal is transmitted from the serializer/deserializer 406. It is therefore necessary for the transmission data (TX DATA2) to be encoded such that it is synchronized to the clock that is output from the BPF 442. In a case where the clock signal that is shown in (B) in FIG. 10 has been input, the transmission data (TX DATA2) is encoded such that the component with the frequency Fb/2 is synchronized to the clock signal.

In a case where the transmission data (TX DATA2) is 1, for example, the encoder 444 outputs, for one cycle only, an upwardly protruding pulse that includes the amplitudes 1 and −1, and in a case where the transmission data (TX DATA2) is zero, the encoder 444 outputs, for one cycle only, a downwardly protruding pulse with the amplitudes 1 and −1. At this time, the frequency of the pulse string that corresponds to the transmission data (TX DATA2) is Fb/2. The transmission data (TX DATA2) is thus encoded into a pulse string that includes the amplitudes 1 and −1. The transmission data (TX DATA2)

that has been encoded by the encoder 444 is input to the combiner/divider 434 through the driver 446.

The combiner/divider 434 combines the code that includes the amplitudes 1 and −1 and that has been input from the encoder 444 with the clock that includes the amplitudes 2 and −2 and that has been transmitted from the serializer/deserializer 406 (M). The code that has been combined by the combiner/divider 434 in this manner includes the amplitudes 3 and −3 in a case where the transmission data (TX DATA2) is 1 and includes the amplitudes 1 and −1 in a case where the transmission data (TX DATA2) is zero. The code that is generated by the combiner/divider 434 is delivered to the coaxial cable through the separation portion 432 and is transmitted to the serializer/deserializer 406 (M).

In the serializer/deserializer 406 (M), the code for the transmission data (TX DATA2) that has been transmitted through the coaxial cable is input to the decoder 422 through the superposition portion 418, the combiner/divider 416, and the receiver 420. The decoder 422 decodes the data based on the amplitude values in the code that has been input. For example, in a case where the amplitude values are 3 and −3, it is determined that the bit value of the data is 1, and in a case where the amplitude values are 1 and −1, it is determined that the bit value of the data is zero. In this process, the decoder 422 decodes the data by using the transmission clock (TX CLK1) that is used in transmitting the transmission data (TX DATA1).

The clock that the serializer/deserializer 408 (D) uses for data transmission is the transmission clock (TX CLK1) that was originally transmitted from the serializer/deserializer 406 (M). It is therefore not necessary for the decoder 422 to detect the clock based on the code that has been input. The data (RX DATA1) and the clock (RX CLK1) that have been decoded by the decoder 422 are input to the BBP 110.

The processing that transmits the data (TX DATA2) from the serializer/deserializer 408 (D) to the serializer/deserializer 406 (M) has been explained. In this manner, data transmission from the serializer/deserializer 408 (D) to the serializer/deserializer 406 (M) is implemented without using a PLL.

Data Transmission Method

Figure 19:
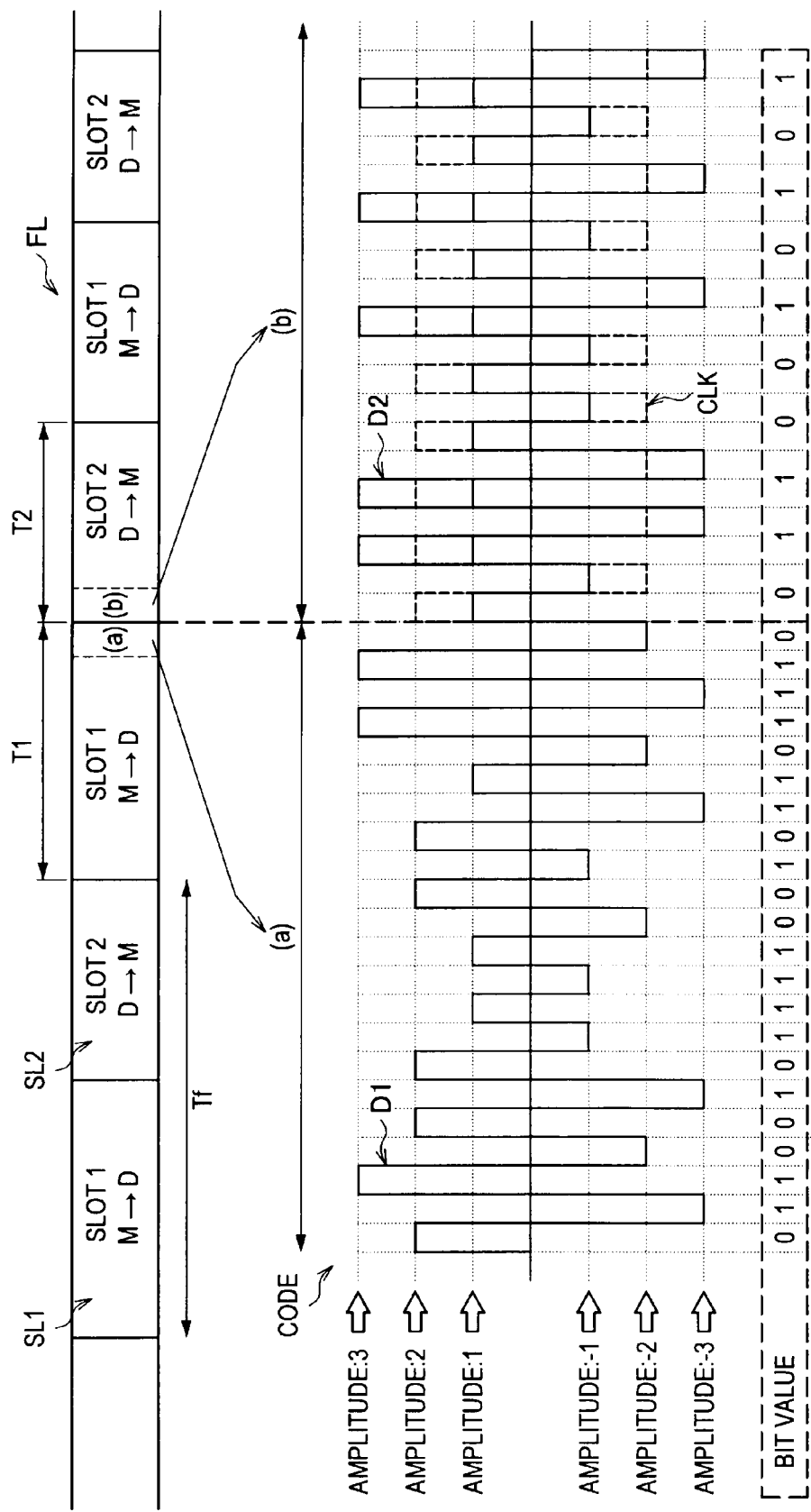
FIG. 19 is an explanatory figure that shows an example of a signal transmission method according to the present embodiment.

Next, the method for transmitting data according to the present embodiment will be explained with reference to FIG. 19. FIG. 19 is an explanatory figure that shows an example of the transmission method according to the present embodiment.

In FIG. 19, data frames FL are shown that are transmitted between the serializers/deserializers 406, 408 by the TDD method. Each of the data frames FL includes a time slot 1 (SL1; M to D) for transmitting data from the serializer/deserializer 406 (M) to the serializer/deserializer 408 (D). In addition, each of the data frames FL includes a time slot 2 (SL2; D to M) for transmitting data from the serializer/deserializer 408 (D) to the serializer/deserializer 406 (M).

The frame length of each of the data frames FL is Tf. The frame length Tf is determined based on the transmission speed that is required for each of the transmission directions (M to D, D to M). In addition, a time segment T1 is allocated to the time slot 1 (SL1; M to D), and a time segment T2 is allocated to the time slot 2 (SL2; D to M). In a case where the data volume of the image data that has been acquired by the image acquisition portion 402 is less than the image data that is displayed on the LCD 104, for example, the relationship between T1 and T2 is that T1 is greater than T2.

In FIG. 19, the codes that are transmitted in parts (a) and (b) of the time slots 1 and 2 are shown in enlarged form. In part (a) of the time slot 1, a code D1 is transmitted from the serializer/deserializer 406 (M) to the serializer/deserializer 408 (D). The code D1 that is transmitted in the time segment (a) is code according to the new method, as shown in (C) in FIG. 10, and it has six amplitude values. The bit values that corresponds to the amplitude values in the respective bit intervals in the code D1 are shown below the code D1.

In contrast, in part (b) of the time slot 2, a code D2 is transmitted from the serializer/deserializer 408 (D) to the serializer/deserializer 406 (M). In FIG. 19, a clock CLK is shown along with the code D2. The clock CLK has been transmitted from the serializer/deserializer 406 (M). Therefore, the clock CLK is a clock for the transmission speed Fb/2. As explained above, the code D2 is generated by synchronizing to the clock CLK and adding the clock CLK to the code that is expressed by the pulses with amplitudes of 1 and −1 that protrude in different directions. Note that in the clock CLK that is added at this time, the jitter has been suppressed by the BPF 442.

The data transmission speed from the serializer/deserializer 406 (M) to the serializer/deserializer 408 (D) was Fb. However, because the transmission speed for the clock that is acquired by the encoder 444 is Fb/2, the data transmission speed from the serializer/deserializer 408 (D) to the serializer/deserializer 406 (M) is also Fb/2. The bit values that correspond to the respective bit intervals are shown below the code D2. It can be understood that the transmission speed for the code D2 is Fb/2 by referring to both the bit values and the clock CLK.

However, it is possible to make Fb the transmission speed for the code D2 in the time segment for the time slot 2 by making Fb the transmission speed for the clock that is transmitted from the serializer/deserializer 406 (M). The reason why the transmission speed for the clock is Fb/2 in the example that is described above is that the mobile terminal 400 is configured such that the clock that is used in the processing that generates the code D1 that is transmitted in the time segment for the time slot 1 is transmitted continuously to the serializer/deserializer 408 (D) in its existing form. Because the mobile terminal 400 is configured in this manner, the frequency of the clock that is generated in the serializer/deserializer 406 (M) is used in each time slot without being changed. Therefore, according to the present embodiment, the clock speed that is used for the data transmission in the time slot 2 can be changed as necessary.

The signal transmission method according to the present embodiment has been explained. As explained above, in the present embodiment, the TDD method is used for the data transmission between the operation portion 108 side and the display portion 102 side. Further, regardless of the transmission direction, the clock is provided from the operation portion 108 side (the serializer/deserializer 406 (M)) to the display portion 102 side (the serializer/deserializer 408 (D)). The clock is used in transmitting data from the display portion 102 side (the serializer/deserializer 408 (D)). It is therefore not necessary to provide a PLL on the display portion 102 side (the serializer/deserializer 408 (D)). This means that bidirectional transmission can be implemented through the serial transmission path and that the amount of electric power that is consumed can be reduced by the amount that a PLL would consume if it were provided.

Summary

In closing, the functional configuration of the mobile terminal 400 according to the present embodiment and the operational effects that are provided by the functional configuration will be briefly summarized.

First, the functional configuration of the mobile terminal 400 according to the present embodiment can be expressed in the following manner. The mobile terminal 400 includes a first information processing module that is equivalent to the operation portion 108 and a second information processing module that is equivalent to the display portion 102.

Within a transmission time segment for the first information processing module, the first information processing module transmits an encoded signal in which input data that contains first and second bit values that differ from one another is encoded such that the first bit value is expressed by a plurality of first amplitude values and the second bit value is expressed by a plurality of second amplitude values that differ from the first amplitude values. The input data is also encoded such that the same amplitude value does not occur twice in succession and such that the polarities of the amplitude values are inverted with each cycle. Furthermore, within a transmission time segment for the second information processing module, the first information processing module transmits a clock signal that corresponds to the cycle at which the polarity of the encoded signal is inverted.

Note that the code for the new method that is shown in (C) in FIG. 10 is one example of the encoded signal that is described above. Using this sort of encoding method makes it possible to transmit the signal by superposing it on the direct current power supply or the like. Moreover, as will be described later, the encoding method makes it possible for the clock signal to be generated by the second information processing module based on the encoded signal, without using a PLL.

The second information processing module includes a clock signal extraction portion, an input data decoding portion, a transmission signal generation portion, and a signal transmission portion. Note that the clock detection portion 438 that is described above is an example of the clock signal extraction portion. Note also that the decoder 440 that is described above is an example of the input data decoding portion. Further, the encoder 444 that is described above is an example of the transmission signal generation portion. In addition, the driver 446 that is described above is an example of the signal transmission portion.

The clock signal extraction portion that is described above extracts the clock signal by detecting the polarity inversions in the signal that is transmitted by the first information processing module. The input data decoding portion that is described above decodes the input data by using the clock signal that has been extracted by the clock signal extraction portion to determine the first and second bit values based on the encoded signal. The transmission signal generation portion that is described above generates a transmission signal by controlling the amplitude values of the clock signal. The signal transmission portion that is described above takes the transmission signal that has been generated by the transmission signal generation portion and transmits it in synchronization with the clock signal.

Thus the second information processing module can extract the clock signal without using a PLL and can use the clock signal to decode the input data. Moreover, as explained above, the clock signal is transmitted from the first information processing module even during the time segment when the second information processing module is transmitting. The clock signal can therefore be used in transmitting the transmission signal from the second information processing module as well. This means that bidirectional transmission can be implemented between the first and second information processing modules without providing a PLL in the second information processing module.

The clock signal extraction portion may also include a filter for suppressing the jitter that is included in the extracted clock signal. In that case, the transmission signal generation portion generates the transmission signal by controlling the amplitude values of the clock signal in which the jitter has been suppressed by the filter. This sort of configuration makes it possible for the transmission signal to be generated based on a clean clock signal from which the jitter has been removed and also makes it possible for the transmission to be precisely synchronized with the clock signal. Note that the BPF 442 is an example of the filter.

The transmission signal generation portion may also be configured such that it generates the transmission signal by controlling the amplitude values of the clock signal such that a direct current component is not included. In that case, the signal transmission portion takes the transmission signal that has been generated by the transmission signal generation portion and transmits it by superposing it on the direct current power supply. This sort of configuration makes it possible, for example, to transmit the direct current power supply and the signal at the same time using a single power supply line.

The second information processing module may also be provided in a display portion of a mobile terminal that includes the display portion for displaying an image and includes a processing portion for processing data, the second information processing module receiving a signal in which data is encoded for the image that will be displayed by the display portion, and the second information processing module also transmitting to the processing portion a transmission signal that corresponds to data that has a smaller data volume than does the image data, the signal being transmitted by being superposed on the direct current power supply.

[Hardware Configuration]

The functions of the constituent elements held by the terminal can be realized by an information processing apparatus having, for example, a hardware configuration shown in FIG. 20. FIG. 20 is a diagram for explaining a hardware configuration of an information processing apparatus which can realize the functions held by the constituent elements of the apparatus.

Note that the forms that the information processing device may take include, for example, a portable information terminal, such as a personal computer, a mobile telephone, a Personal Handyphone System (PHS), a personal digital assistant (PDA), or the like, as well as a game device, various types of smart household appliances, and the like.

As shown in FIG. 20, the information processing apparatus mainly includes a CPU (Central Processing Unit) 902, a ROM (Read Only Memory) 904, a RAM (Random Access Memory) 906, a Host bus 908, a bridge 910, an external bus 912, an interface 914, an input unit 916, an output unit 918, a storage unit 920, a drive 922, a connection port 924, and a communication unit 926.

The CPU 902 functions as an arithmetic processing unit or a control unit and controls an entire operation of the constituent elements or some of the constituent elements on the basis of various programs recorded on the ROM 904, the RAM 906, the storage unit 920, or the removal recording medium 928. The ROM 904 stores, for example, a program loaded on the CPU 902 or data or the like used in an arithmetic operation. The RAM 906 temporarily or perpetually stores, for example, a program loaded on the CPU 902 or various parameters or the like arbitrarily changed in execution of the program. These constituent elements are connected to each other by, for example, the host bus 908 which can perform high-speed data transmission. The host bus 908, for example, is connected to the external bus 912 in which a data transmission speed is relatively low through the bridge 910.

The input unit 916 is, for example, an operation unit such as a mouse, a keyboard, a touch panel, button, a switch, or a lever. The input unit 916 may be a remote control unit (so-called remote) that can transmit a control signal by using an infrared ray or other radio waves. The input unit 916 includes an input control circuit or the like to transmit information input by using the operation unit to the CPU 902 through an input signal.

The output unit 918 is, for example, a display device such as a CRT (Cathode Ray Tube), an LCD (Liquid Crystal Display), a PDP (Plasma Display Panel), or an ELD (Electro-Luminescence Display), an audio output device such as a loudspeaker or headphones, a printer, a mobile phone, or a facsimile that can visually or auditorily notify a user of acquired information.

The storage unit 920 is a device to store various data, and includes, for example, a magnetic storage device such as a hard disk drive (HDD; Hard Disk Drive), a semiconductor storage device, an optical storage device, or a magnetooptical storage device, or the like.

The drive 922 is a device that reads information recorded on the removal recording medium 928 such as a magnetic disk, an optical disk, a magnetooptical disk, or a semiconductor memory or writes information in the removal recording medium 928. The removal recording medium 928 is, for example, a DVD medium, a Blue-ray medium, an HD-DVD medium, a compact flash (CF; compactFlash) (registered trademark), a memorystick, or an SD memory card (Secure Digital memory card), or the like. As a matter of course, the removal recording medium 928 may be, for example, an IC card (Integrated Circuit Card) on which a non-contact IC chip is mounted, an electronic device, or the like.

The connection port 924 is a port such as an USB (Universal Serial Bus) port, an IEEE1394 port, an SCSI (Small Computer System Interface), an RS-232C port, or an optical audio terminal to which the external connection device 930 is connected. The external connection device 930 is, for example, a printer, a mobile music player, a digital camera, a digital video camera, an IC recorder, or the like.

The communication unit 926 is a communication device to be connected to a network 932. For example, a communication card for a wired or wireless LAN (Local Area Network), Bluetooth (registered trademark), or WUSB (Wireless USB), an optical communication router, an ADSL (Asymmetric Digital Subscriber Line) router, various communication modems, or the like is used. The network 932 connected to the communication unit 926 includes a wiredly or wirelessly connected network. For example, the Internet, a home-use LAN, infrared communication, broadcasting, satellite communication, or the like is used.

Note that an AD converter and a DA converter are connected to the interface 914. A digital signal that has been converted by the AD converter is input, and an output signal is converted into an analog signal by the DA converter.

It should be understood by those skilled in the art that various modifications, combinations, sub-combinations and alterations may occur depending on design requirements and other factors insofar as they are within the scope of the appended claims or the equivalents thereof.

For example, the embodiment that is described above was explained using the AMI code as an example of the code that is input to the adder ADD, but the technology of the present invention is not limited to this example. As has already been described, various types of bipolar codes and codes according to partial response methods, such as PR $(1, -1)$, PR $(1, 0, -1)$, PR $(1, 0, \ldots, 0, -1)$, and the like, are also used. It is preferable to use a code format that utilizes polarity inversion, as these examples do. These sorts of codes can be generated by bit shifting and the like. Any number of modified examples of this sort of code generation method can be envisioned.

The present application contains subjected matter related to that disclosed in Japanese Priority Patent Application JP 2008-198394 filed in the Japan Patent Office on Jul. 31, 2008, the entire contents of which is hereby incorporated by reference.

What is claimed is:

1. An information processing device, comprising:
a first information processing module that, within a transmission time segment for the first information processing module, transmits an encoded signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle, and that, within a transmission time segment for a second information processing module, transmits a clock signal that corresponds to the cycle at which the polarity of the encoded signal is inverted; and
the second information processing module that includes
a clock signal extraction portion that extracts the clock signal by detecting the polarity inversions in the signal that is transmitted by the first information processing module,
an input data decoding portion that decodes the input data by using the clock signal that has been extracted by the clock signal extraction portion to determine the first and second bit values based on the encoded signal,
a transmission signal generation portion that generates a transmission signal by controlling the amplitude values of the clock signal by encoding transmission data such that the transmission data is synchronized to the clock signal, and
a signal transmission portion that transmits the transmission signal that has been generated by the transmission signal generation portion.

2. The information processing device according to claim 1, wherein the clock signal extraction portion includes a filter for suppressing jitter that is included in the extracted clock signal, and the transmission signal generation portion generates the transmission signal by controlling the amplitude values of the clock signal in which the jitter has been suppressed by the filter.

3. The information processing device according to claim 1, wherein the transmission signal generation portion generates the transmission signal by controlling the amplitude values of the clock signal such that a direct current component is not included, and the signal transmission portion transmits the transmission signal that has been generated by the transmission signal generation portion by superposing it on a direct current power supply.

4. An information processing device, comprising:
a first information processing module that, within a transmission time segment for the first information processing module, transmits an encoded signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle, and that, within a transmission time segment for a second information processing module, transmits a clock signal that corresponds to the cycle at which the polarity of the encoded signal is inverted; and the second information processing module that includes
- a clock signal extraction portion that extracts the clock signal by detecting the polarity inversions in the signal that is transmitted by the first information processing module,
- an input data decoding portion that decodes the input data by using the clock signal that has been extracted by the clock signal extraction portion to determine the first and second bit values based on the encoded signal,
- a transmission signal generation portion that generates a transmission signal by controlling the amplitude values of the clock signal, and
- a signal transmission portion that transmits, in synchronization with the clock signal, the transmission signal that has been generated by the transmission signal generation portion, wherein the signal transmission portion transmits the transmission signal that has been generated by the transmission signal generation portion by superposing it on a direct current power supply, the second information processing module is provided in a display portion of a mobile terminal that includes the display portion for displaying an image and includes a processing portion for processing data, the second information processing module receiving a signal in which data is encoded for the image that will be displayed by the display portion, and the second information processing module transmitting to the processing portion a transmission signal that corresponds to data that has a smaller data volume than does the image data, the signal being transmitted by being superposed on the direct current power supply.

5. A bidirectional transmission method, comprising:

transmitting, within a transmission time segment for a first information processing module, a signal in which input data that contains first and second bit values that differ from one another is encoded such that the first bit value is expressed by a plurality of first amplitude values and the second bit value is expressed by a plurality of second amplitude values that differ from the first amplitude values, the input data also being encoded such that the same amplitude value does not occur twice in succession and such that the polarities of the amplitude values are inverted with each cycle, the signal being transmitted by the first information processing module;

receiving the signal that has been transmitted by the first information processing module, the signal being received by a second information processing module;

extracting a clock signal by detecting polarity inversions in the received signal, the clock signal being extracted by the second information processing module;

decoding the input data in the received signal by using the extracted clock signal, the input data being decoded by the second information processing module;

transmitting the clock signal within a transmission time segment for the second information processing module, the clock signal being transmitted by the first information processing module;

generating a transmission signal by controlling the amplitude values of the extracted clock signal by encoding transmission data such that the transmission data is synchronized to the clock signal, the transmission signal being generated by the second information processing module; and transmitting the generated transmission signal, the transmission signal being transmitted by the second information processing module.

* * * * *